(12) United States Patent
Mizuguchi et al.

(10) Patent No.: US 8,886,661 B2
(45) Date of Patent: Nov. 11, 2014

(54) INFORMATION EXTRACTION SYSTEM, INFORMATION EXTRACTION METHOD, INFORMATION EXTRACTION PROGRAM, AND INFORMATION SERVICE SYSTEM

(75) Inventors: Hironori Mizuguchi, Tokyo (JP); Masaaki Tsuchida, Tokyo (JP); Dai Kusui, Tokyo (JP); Hideki Kawai, Tokyo (JP)

(73) Assignee: NEC Corporation, Tokyo (JP)

(*) Notice: Subject to any disclaimer, the term of this patent is extended or adjusted under 35 U.S.C. 154(b) by 1659 days.

(21) Appl. No.: 12/294,143

(22) PCT Filed: Mar. 23, 2007

(86) PCT No.: PCT/JP2007/055958
§ 371 (c)(1),
(2), (4) Date: Oct. 14, 2010

(87) PCT Pub. No.: WO2007/108529
PCT Pub. Date: Sep. 27, 2007

(65) Prior Publication Data
US 2011/0161144 A1 Jun. 30, 2011

(30) Foreign Application Priority Data
Mar. 23, 2006 (JP) .................................. 2006-081598

(51) Int. Cl.
G06F 17/30 (2006.01)
G06F 17/28 (2006.01)
G06F 17/27 (2006.01)
G06Q 30/02 (2012.01)
G06Q 30/06 (2012.01)

(52) U.S. Cl.
CPC ........ G06F 17/2775 (2013.01); G06Q 30/0241 (2013.01); G06Q 30/0601 (2013.01)
USPC ............................................. 707/758; 704/9

(58) Field of Classification Search
CPC ................ Y10S 707/99936; Y10S 707/99931; G06F 17/30011; G06F 17/274
USPC ....................... 707/736, 741, 748, 758; 704/9
See application file for complete search history.

(56) References Cited

U.S. PATENT DOCUMENTS

| 6,041,323 A | * | 3/2000 | Kubota | 1/1 |
| 7,315,867 B2 | * | 1/2008 | Kobayashi et al. | 1/1 |
| 7,797,303 B2 | * | 9/2010 | Roulland et al. | 707/713 |

FOREIGN PATENT DOCUMENTS

| JP | 2001-297100 | 10/2001 |
| JP | 2002-108887 | 4/2002 |
| JP | 2003-256447 | 9/2003 |
| JP | 2003-330947 | 11/2003 |
| JP | 2004-151926 | 5/2004 |
| JP | 2004-152041 | 5/2004 |

OTHER PUBLICATIONS

Shinsuke Mod et al., "Unknown Word Extraction from Corpora Using n-gram Statistics", Transactions of Information Processing Society of Japan, Jul. 15, 1998, vol. 39, No. 7, pp. 2093-2100.

Nicholas Kushmerick, "Wrapper induction: Efficiency and expressiveness", Artificial Intelligence, 118 (2000), 2008, pp. 15-68.

* cited by examiner

Primary Examiner — Hung T Vy
(74) Attorney, Agent, or Firm — Young & Thompson

(57) ABSTRACT

According to the present invention, phrases of the same kind can be extracted from a plurality of documents having various formats. A storage device stores a plurality of documents that have various formats. A pattern candidate creating unit receives a list of input words that are selected as samples among phrases that are to be included in a dictionary. The pattern candidate creating unit selects one document, determines forward and backward character strings of input words in the selected document as candidates of patterns, and stores the forward and backward character strings as a pattern candidate. The pattern candidate creating unit executes the above processes for each of the documents. A phrase candidate creating unit extracts phrases interposed between patterns included in the pattern candidate as candidates of phrases to be output, and stores the extracted phrases as a phrase candidate. A phrase selecting unit outputs a candidate of a phrase satisfying a predetermined condition among candidates of phrases included in the phrase candidate as an output word to an output device.

25 Claims, 15 Drawing Sheets

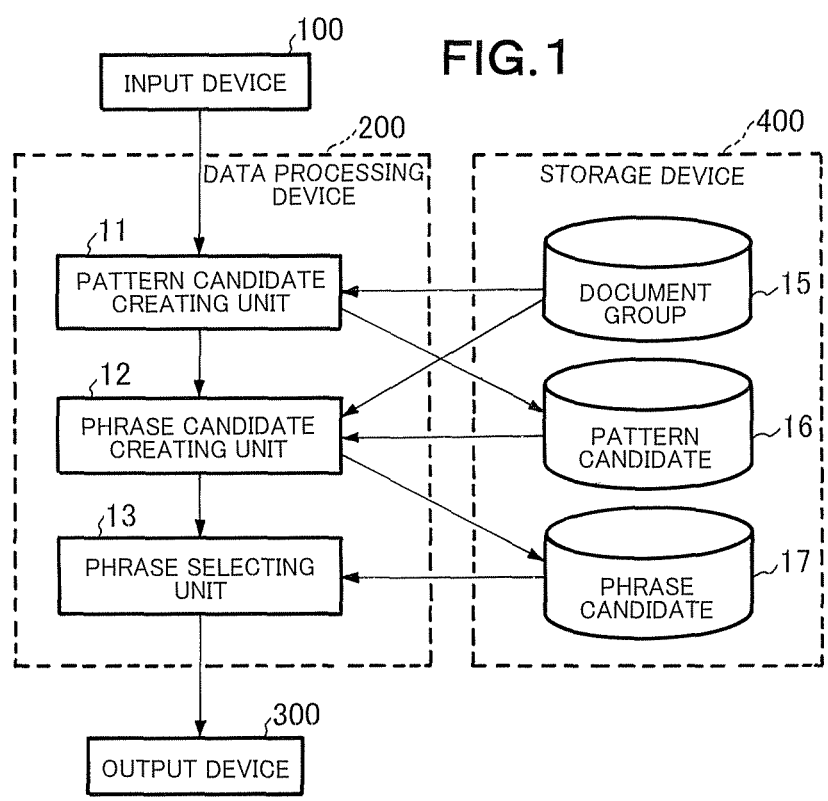

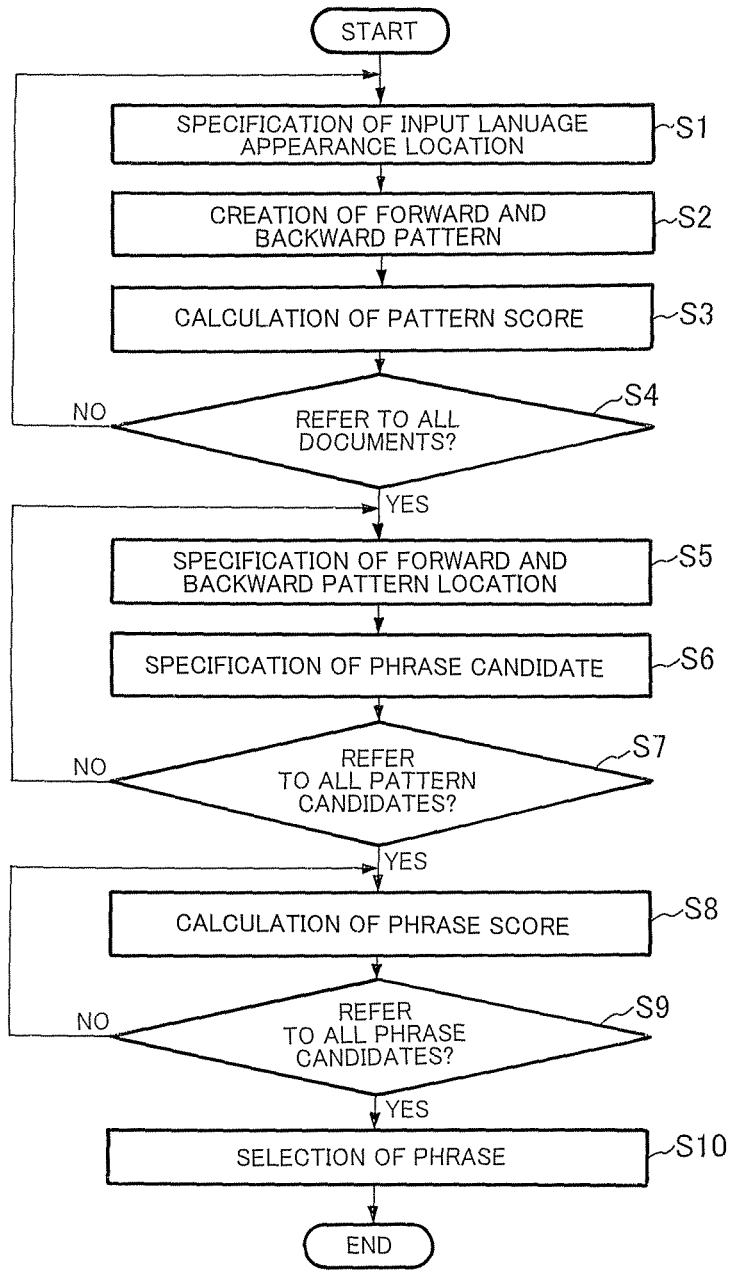

FIG.3

| DOCUMENT ID | DOCUMENT TEXT |
|---|---|
| DOCUMENT A | \<html\>…\<tr\>\<td\> PRODUCT A \</td\>…\<tr\>\<td\> PRODUCT B \</td\>…\<tr\>\<td\> PRODUCT C \</td\>…\<tr\>\<td\> PRODUCT D \</td\>…\<tr\>\<td\> PRODUCT E \</td\>… |
| DOCUMENT B | \<html\>…\<font size="10"\> PRODUCT B \</font\>\<br\>\<font size="10"\> PRODUCT A\</font\>\<br\>\<font size="10"\> PRODUCT C\</font\>\<p\>\<b\>・CATEGORY OF PRODUCT C \<b\>\<br\>…\<font size="10"\> PRODUCT D \</font\>\<br\>… |
| DOCUMENT C | \<html\>…\<tr\>\<td\> COMPANY A \</td\>\<td\>… |
| DOCUMENT D | …COMMODITY｜PRODUCT A｜PRICE｜234 COMMODITY｜PRODUCT C｜PRICE｜345… |
| DOCUMENT E | \<html\>…\<td\> PRODUCT A \</td\>…\<tr\>\<td\> PRODUCT B \</td\>\</tr\>…\<td\> PRODUCT C \</td\>\</tr\> |
| … | … |

FIG.4

| INPUT WORD LIST |
|---|
| PRODUCT A |
| PRODUCT B |
| PRODUCT C |

FIG.5

| PATTERN ID | DOCUMENT ID | FORWARD PATTERN CANDIDATE | BACKWARD PATTERN CANDIDATE | PATTERN SCORE |
|---|---|---|---|---|
| PAT1 | DOCUMENT A | r><tr><td> | </td><td>< | 3/3 |
| PAT2 | DOCUMENT B | size="10"> | </font>< | 3/4 |
| PAT3 | DOCUMENT B | size="10"> | </font><br> | 2/4 |
| PAT4 | DOCUMENT B | size="10"> | </font><p> | 1/4 |
| PAT5 | DOCUMENT B | nt><p><b>· | CATEGORY<b><b | 1/4 |
| PAT6 | DOCUMENT D | ... | ... | ... |
| ... | | | | |

FIG.6

| DOCUMENT ID | CANDIDATE OF PHRASE | PATTERN ID | PATTERN SCORE |
|---|---|---|---|
| DOCUMENT A | PRODUCT D | PAT1 | 3/3 |
| DOCUMENT A | PRODUCT E | PAT1 | 3/3 |
| DOCUMENT A | PRODUCT F | PAT1 | 3/3 |
| DOCUMENT B | PRODUCT D | PAT2 | 3/4 |
| DOCUMENT B | PRODUCT G | PAT2 | 3/4 |
| DOCUMENT B | PRODUCT D | PAT3 | 2/4 |
| DOCUMENT B | PRODUCT G | PAT4 | 1/4 |
| DOCUMENT B | CLASSIFICATION 1 | PAT5 | 1/4 |
| DOCUMENT B | CLASSIFICATION 2 | PAT5 | 1/4 |
| DOCUMENT D | PRODUCT E | PAT6 | 2/2 |
| DOCUMENT D | PRODUCT D | PAT6 | 2/2 |
| DOCUMENT D | PRODUCT G | PAT6 | 2/2 |
| ... | ... | ... | ... |

FIG.7

| OUTPUT WORD | PHRASE SCORE |
|---|---|
| PRODUCT E | 2.625 |
| PRODUCT D | 2.000 |
| PRODUCT G | 2.000 |
| PRODUCT F | 1.000 |

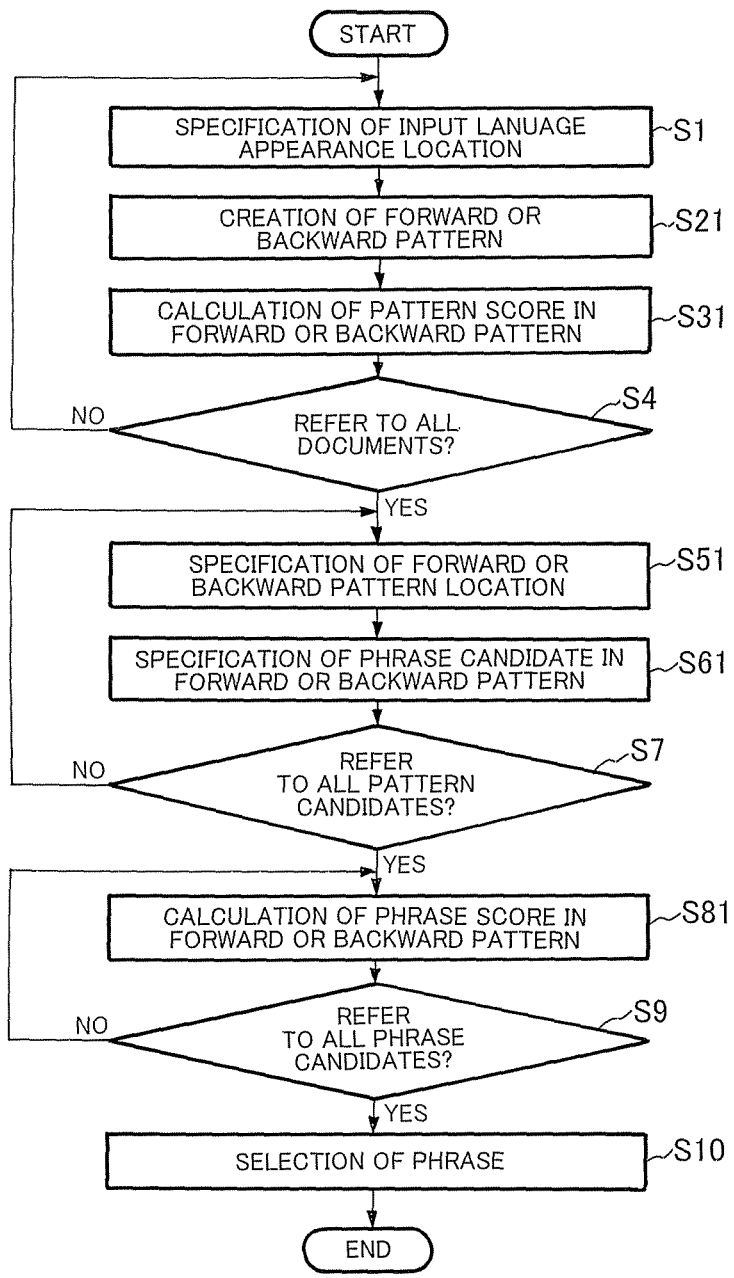

FIG.9

| DOCUMENT ID | DOCUMENT TEXT |
|---|---|
| DOCUMENT A | \<html\>...\<tr\>\<td\> PRODUCT A \</td\>...\<tr\>\<td\> PRODUCT B \</td\>...\<tr\>\<td\> PRODUCT C \</td\>...\<tr\>\<td\> PRODUCT D \</td\>...\<tr\>\<td\> PRODUCT E \</td\>... |
| DOCUMENT B | \<html\>...\<font size="10"\> PRODUCT B \</font\>\<br\>\<font size="10"\> PRODUCT A\</font\>\<br\>\<font size="10"\> PRODUCT C\</font\>\<p\>\<b\>・CATEGORY OF PRODUCT C \<b\>\<br\>...\<font size="10"\> PRODUCT D*\</font\>\<br\>... |
| DOCUMENT C | \<html\>...\<tr\>\<td\> COMPANY A \</td\>\<td\>... |
| DOCUMENT D | ...COMMODITY \| PRODUCT A \| PRICE \| 234 COMMODITY \| PRODUCT C \| PRICE \| 345... |

FIG.10

| PATTERN ID | DOCUMENT ID | FORWARD PATTERN CANDIDATE | PATTERN SCORE |
|---|---|---|---|
| PAT21 | DOCUMENT A | r><tr><td> | 3/3 |
| PAT22 | DOCUMENT B | size="10"> | 3/4 |
| PAT23 | DOCUMENT B | nt><p><b>・ | 1/4 |
| PAT24 | DOCUMENT D | PRICE \| 234 \| COMMODITY | 2/2 |
| ... | ... | ... | ... |

FIG.11

| DOCUMENT ID | CANDIDATE OF PHRASE | PATTERN ID | PATTERN SCORE |
|---|---|---|---|
| DOCUMENT A | PRODUCT D </t | PAT21 | 3/3 |
| DOCUMENT A | PRODUCT E </t | PAT21 | 3/3 |
| DOCUMENT A | PRODUCT F </t | PAT21 | 3/3 |
| DOCUMENT B | PRODUCT D*</ | PAT22 | 3/4 |
| DOCUMENT B | PRODUCT G </f | PAT22 | 3/4 |
| DOCUMENT B | CATEGORY OF CLASSIFICATION 1 | PAT23 | 1/4 |
| DOCUMENT B | CATEGORY OF CLASSIFICATION 2 | PAT23 | 1/4 |
| DOCUMENT D | PRDOUCT E \| PRICE | PAT24 | 2/2 |
| DOCUMENT D | PRODUCT D \| PRICE | PAT24 | 2/2 |
| DOCUMENT D | PRODUCT G \| PRICE | PAT24 | 2/2 |

INFORMATION EXTRACTION SYSTEM, INFORMATION EXTRACTION METHOD, INFORMATION EXTRACTION PROGRAM, AND INFORMATION SERVICE SYSTEM

TECHNICAL FIELD

The present invention relates to an information extraction system, an information extraction method, an information extraction program, and an information service system. In particular, the present invention relates to an information extraction system that can precisely extract phrases of a kind that a user desires from a document group, an information extraction method, an information extraction program, and an information service system using the information extraction system.

BACKGROUND ART

In order to know a kind of a certain phrase (for example, a kind, such a person's name or a place name), it may be inspected whether the corresponding phrase is included in various dictionaries according to individual kinds (for example, a person's name dictionary or a place name dictionary). For example, if the certain phrase is included in the person's name dictionary, it is possible to know that a kind of the corresponding phrase is a person's name. In this case, in order to know the kind of the certain phrase, a dictionary according to the kind is needed.

Here, the phrase indicates a word or a unity of a plurality of words. Examples of the unity of the plurality of words may include a phrase that is composed of a plurality of words, a proverb or an idiomatic phrase. In addition, a proper noun, such as a person's name or a place name, is included in the concept of the phrase, too. In addition, the dictionary is assumed as a list of phrases of the same kind.

As a method for creating the above dictionary, there is a method in which a person reads a large amount of various types of documents, classifies a large amount of phrases according to the kinds of the phrases, and registers the corresponding phrases in the dictionary. In this method, it is possible to create a dictionary having high reliability where phrases of the same kind are collected. However, since the work is made by person's hands, it is inconvenient for the person who creates the dictionary.

In addition, a dictionary creation method is disclosed in Non-patent Document 1. In the dictionary creation method that is disclosed in Non-patent Document 1, patterns are automatically created from a document group of the same format, words between the patterns are extracted, and the words are registered in the dictionary. In this case, the "document of the same format" is a document where phrases becoming extraction subjects in the document appear adjacent to the same pattern. In addition, the "pattern" is a character string that distinguishes phrases, which are included in the dictionary (targeted phrases), from phrases, which are not included in the dictionary. The patterns include a pattern that is located in front of the phrase becoming the extraction subject (hereinafter, referred to as forward pattern) and a pattern that is located in the back of the phrase becoming the extraction subject (hereinafter, referred to as backward pattern).

An example of the case where a dictionary of company names is created using the dictionary creation method disclosed in Non-patent Document 1 will now be described. First, a person collects a document group having the same format where company names are arranged in a form of a table and described. Next, the person selects several documents from the document group and creates a list of company names included in the document. Next, an information processing device automatically specifies a forward pattern and a backward pattern of the company names that appear in the previously selected document in accordance with a program, and extracts words (in this example, company names) that are interposed between the forward pattern and the backward pattern. Finally, the person registers the extracted words in the dictionary. As such, in the method that is disclosed in Non-patent Document 1, the person inputs the documents selected as samples and a list of all words appearing in the corresponding documents to the information processing device. As a result, the information processing device automatically creates the dictionary.

In addition, Patent Document 1 discloses a method in which, with respect to xay and xby that are obtained by coupling character strings x and y in front of and in the back of each of the two words a and b, a score function is defined, and relevance between the two words is determined.

[Non-patent Document 1] Nicholas Kushmerick [Wrapper induction: Efficiency and expressiveness], Artificial Intelligence 118 (2000), 2008, p. 15 to 68

[Patent Document 1] JP-A-2003-256447 (paragraphs 0029 to 0032)

DISCLOSURE OF THE INVENTION

Problems to be Solved by the Invention

In the method that is disclosed in Non-patent Document 1, it is assumed that the document group having the same format is input. Accordingly, it is not possible to extract phrases from a plurality of documents having various formats. In order to extract the phrases from the plurality of documents having the various formats, a person should select a document as a sample for each document group of each format and create a list of phrases included in the corresponding document. For this reason, there is a problem in that it is inconvenient for the person. Actually, there are various formats of documents. For example, the document formats include a table format where phrases are distinguished from each other by spaces, a table format where phrases are distinguished from each other by tabs, a list format, and a hierarchy format. However, the creation of the list of phrases or the selection of the sample document for each of the various kinds of formats is inconvenient for a user who uses the method disclosed in Non-patent Document 1.

Accordingly, it is an object of the present invention to provide an information extraction system that can extract phrases of the same kind from a plurality of documents having various formats, an information extraction method, an information extraction program, and an information service system using the information extraction system.

Means for Solving the Problems

An information extraction system according to the present invention is an information extraction system that extracts phrases in documents from the documents and outputs the extracted phrases. The information extraction system includes an input unit that receives an input word list including a plurality of phrases; a pattern determining unit that selects one document from a plurality of documents including documents whose formats are different from each other, and determines a character string, which separates a phrase included in an input word list from a character string becoming a non-extraction subject in the selected document, as a pattern, for each of the documents; a phrase candidate extracting unit that extracts a character string separated by a pattern from a document used in determining the pattern and determines the character string as a candidate of a phrase; and a phrase selecting unit that selects a candidate of a phrase or a partial character string satisfying a predetermined condition as a phrase of an output subject among candidates of phrases extracted by the phrase candidate extracting unit or partial character strings included in the candidates of the phrases.

According to the present invention, the pattern determining unit selects one document from a plurality of documents including documents whose formats are different from each other, and determines a character string, which separates a phrase included in an input word list from a character string becoming a non-extraction subject in the selected document, as a pattern, for each of the documents. In addition, the phrase candidate extracting unit extracts a character string separated by a pattern from a document used in determining the pattern and determines the character string as a candidate of a phrase. The phrase selecting unit selects a candidate of a phrase or a partial character string satisfying a predetermined condition as a phrase of an output subject among candidates of phrases extracted by the phrase candidate extracting unit or partial character strings included in the candidates of the phrases. Accordingly, it is possible to extract phrases of the same kind from a plurality of documents that include documents whose formats are different from each other. In addition, since the phrase selecting unit selects a candidate of a phrase or a partial character string satisfying a predetermined condition as a phrase of an output subject, it is possible to improve reliability of phrases to be output (reliability of phrases of the same kind).

The pattern determining unit may determine a forward character string and a backward character string of the phrase included in the input word list as patterns, the phrase candidate extracting unit may extract a character string interposed between the forward character string and the backward character string from the document and determine the extracted character string as a candidate of a phrase, and the phrase selecting unit may select a phrase of an output subject from the candidates of the phrases, which are extracted by the phrase candidate extracting unit.

The phrase selecting unit may calculate a phrase score indicating a value of a degree of importance of a candidate of the pattern used in specifying the candidate of the phrase or the amount of documents where the candidate of the phrase appears for each of the candidates of the phrases, and select the candidate of the phrase whose phrase score is equal to or larger than a predetermined threshold value as the phrase of the output subject.

The phrase selecting unit may calculate a phrase score indicating a value of a degree of importance of a candidate of the pattern used in specifying the candidate of the phrase or the amount of documents where the candidate of the phrase appears for each of the candidates of the phrases, sort the candidates of the phrases in the order of high phrase scores, and select the candidate of the phrase at a predetermined rank or more as the phrase of the output subject.

The phrase selecting unit may calculate a phrase score indicating a value of a degree of importance of a candidate of the pattern used in specifying the candidate of the phrase or the amount of documents where the candidate of the phrase appears for each of the candidates of the phrases, sort the candidates of the phrases in the order of high phrase scores, and select the candidate of the phrase at high ranks of a predetermined ratio as the phrase of the output subject.

The pattern determining unit may determine only a forward character string of the phrase included in the input word list or a backward character string of the phrase included in the input word list as a pattern, the phrase candidate extracting unit may extract a character string subsequent to the forward character string or a character string immediately before the backward character string from the document and determine the extracted character string as the candidate of the phrase, and the phrase selecting unit may create partial character strings included in the candidate of the phrase, and select a phrase of the output subject from the created partial character strings. According to this configuration, it is possible to output phrases from which an unnecessary suffix or prefix is excluded.

The phrase selecting unit may calculate a ratio of the number of the candidates of the phrases including the partial character strings with respect to a total number of the candidates of the phrases for each of the candidates of the phrases and each of the partial character strings, specify the partial character strings where the ratio is within a predetermined ratio, calculate a phrase score indicating a value of a degree of importance of the candidate of the pattern used in specifying the candidate of the phrase or the amount of documents where the candidate of the phrase appears for each of the candidates of the phrases including the specified partial character strings to determine the calculation result as the phrase score of the partial character string, and select the partial character string where a phrase score is equal to or larger than a predetermined threshold value as the phrase of the output subject.

The phrase selecting unit may calculate a ratio of the number of the candidates of the phrases including the partial character strings with respect to a total number of the candidates of the phrases for each of the candidates of the phrases and each of the partial character strings, specify the partial character strings where the ratio is within a predetermined ratio, calculate a phrase score indicating a value of a degree of importance of the candidate of the pattern used in specifying the candidate of the phrase or the amount of documents where the candidate of the phrase appears for each of the candidates of the phrases including the specified partial character strings to determine the calculation result as the phrase score of the partial character string, sort the partial character strings in the order of high phrase scores, and select the partial character string at a predetermined rank or more as the phrase of the output subject.

The phrase selecting unit may calculate a ratio of the number of the candidates of the phrases including the partial character strings with respect to a total number of the candidates of the phrases for each of the candidates of the phrases and each of the partial character strings, specify the partial character strings where the ratio is within a predetermined ratio, calculate a phrase score indicating a value of a degree of importance of the candidate of the pattern used in specifying the candidate of the phrase or the amount of documents where the candidate of the phrase appears for each of the candidates of the phrases including the specified partial character strings to determine the calculation result as the phrase score of the partial character string, sort the partial character strings in the order of high phrase scores, and select the partial character string at high ranks of a predetermined ratio as the phrase of the output subject.

The information extraction system may further include a document searching unit that searches a document, which includes all of a plurality of phrases selected from the input word list, from the plurality of documents, which include documents whose formats are different from each other and are stored in a storage device in advance. The pattern determining unit may determine a pattern for each of the documents, which are searched by the document searching unit. According to this configuration, the pattern determination is made with respect to the document where the possibility of phrases of the same kind appearing is high, and a character string separated by a pattern is determined as a candidate of a phrase in the document. Therefore, it is possible to improve reliability of phrases to be output.

The information extraction system may further include a recreating unit that provides a list of the phrases selected by the phrase selecting unit as the input word list to the document searching unit. According to this configuration, since the document searching unit that is provided with the input word list restarts its operation, it is possible to increase the number of phrases that are selected as phrases of output subjects. As a result, it is possible to recursively extract phrases of the same kind.

The information extraction system may further include a recreating unit that provides a list of the phrases selected by the phrase selecting unit as the input word list to the pattern determining unit. According to this configuration, since the pattern determining unit that is provided with the input word list restarts its operation, it is possible to increase the number of phrases that are selected as phrases of output subjects. As a result, it is possible to recursively extract phrases of the same kind.

Further, an information service system according to the present invention includes any one of the above-described information extraction systems; a dictionary database that stores a dictionary that is a list of phrases of the same kind; and a dictionary service system that manages an amount of money that is exchanged when the dictionary is created and sold. In this case, the dictionary service system includes a registering unit that inputs an input word list created by an input word list creator to the information extraction system, receives a list of phrases from the information extraction system, and registers a dictionary including the phrases included in the list of phrases and the input word list in the dictionary database; a dictionary providing unit that transmits the dictionary stored in the dictionary database to a terminal of a dictionary buyer, in accordance with a request from the terminal of the dictionary buyer; a monetary information storage unit that stores an amount of money exchanged when the dictionary is created and sold; and a monetary information registering unit that stores an amount of money, which an operator of the dictionary service system needs to pay to the input word list creator as a value of creation of the dictionary, and an amount of money, which the dictionary buyer needs to pay to the operator of the dictionary service system as a value of the dictionary, in the monetary information storage unit.

The information service system may further include a trend keyword storage unit that stores phrases becoming trendy. The dictionary service system may include a trend keyword providing unit that reads out the phrases becoming trendy from the trend keyword storage unit and transmits the phrases to a terminal of the input word list creator.

Furthermore, an information service system according to the present invention includes any one of the above-described information extraction systems; a dictionary database that stores a dictionary that is a list of phrases of the same kind; and an advertisement service system that receives a keyword from an advertisement display device displaying an advertisement and transmits an advertisement to the advertisement display device. In this case, the advertisement service system includes a registering unit that inputs an input word list created by an input word list creator to the information extraction system, receives a list of phrases from the information extraction system, and registers a dictionary including the phrases included in the list of phrases and the input word list in the dictionary database; an advertisement storage unit that associates an advertisement and a related keyword that is related to the corresponding advertisement with each other and stores the advertisement and the related keyword; and an advertisement providing unit that searches a dictionary including the keyword received from the advertisement display device from dictionaries stored in the dictionary database, reads out an advertisement, which is associated with a phrase included in the searched dictionary, and an advertisement, which is associated with a keyword received from the advertisement display device, from the advertisement storage unit, and transmits the read advertisements to the advertisement display device.

Furthermore, an information extraction method according to the present invention is an information extraction method that extracts phrases in documents from the documents. The information extraction method includes allowing an input unit to input an input word list including a plurality of phrases; allowing a pattern determining unit to select one document from a plurality of documents including documents whose formats are different from each other, and determine a character string, which separates a phrase included in an input word list from a character string becoming a non-extraction subject in the selected document, as a pattern, for each of the documents; allowing a phrase candidate extracting unit to extract a character string separated by a pattern from a document used in determining the pattern and determine the character string as a candidate of a phrase; and allowing a phrase selecting unit to select a candidate of a phrase or a partial character string satisfying a predetermined condition as a phrase of an output subject among candidates of phrases extracted by the phrase candidate extracting unit or partial character strings included in the candidates of the phrases.

The pattern determining unit may determine a forward character string and a backward character string of the phrase included in the input word list as patterns, the phrase candidate extracting unit may extract a character string interposed between the forward character string and the backward character string from the document and determine the extracted character string as a candidate of a phrase, and the phrase selecting unit may select a phrase of an output subject from the candidates of the phrases, which are extracted by the phrase candidate extracting unit.

The phrase selecting unit may calculate a phrase score indicating a value of a degree of importance of a candidate of the pattern used in specifying the candidate of the phrase or the amount of documents where the candidate of the phrase appears for each of the candidates of the phrases, and select the candidate of the phrase whose phrase score is equal to or larger than a predetermined threshold value as the phrase of the output subject.

The phrase selecting unit may calculate a phrase score indicating a value of a degree of importance of a candidate of the pattern used in specifying the candidate of the phrase or the amount of documents where the candidate of the phrase appears for each of the candidates of the phrases, sorts the candidates of the phrases in the order of high phrase scores, and select the candidate of the phrase at a predetermined rank or more as the phrase of the output subject.

The phrase selecting unit may calculate a phrase score indicating a value of a degree of importance of a candidate of the pattern used in specifying the candidate of the phrase or the amount of documents where the candidate of the phrase appears for each of the candidates of the phrases, sort the candidates of the phrases in the order of high phrase scores, and select the candidate of the phrase at high ranks of a predetermined ratio as the phrase of the output subject.

The pattern determining unit may determine only a forward character string of the phrase included in the input word list or a backward character string of the phrase included in the input word list as a pattern, the phrase candidate extracting unit may extract a character string subsequent to the forward character string or a character string immediately before the backward character string from the document and determine the extracted character string as the candidate of the phrase, and the phrase selecting unit may create partial character strings included in the candidate of the phrase, and select a phrase of the output subject from the created partial character strings.

The phrase selecting unit may calculate a ratio of the number of the candidates of the phrases including the partial character strings with respect to a total number of the candidates of the phrases for each of the candidates of the phrases and each of the partial character strings, specify the partial character strings where the ratio is within a predetermined ratio, calculate a phrase score indicating a value of a degree of importance of the candidate of the pattern used in specifying the candidate of the phrase or the amount of documents where the candidate of the phrase appears for each of the candidates of the phrases including the specified partial character strings to determine the calculation result as the phrase score of the partial character string, and select the partial character string where a phrase score is equal to or larger than a predetermined threshold value as the phrase of the output subject.

The phrase selecting unit may calculate a ratio of the number of the candidates of the phrases including the partial character strings with respect to a total number of the candidates of the phrases for each of the candidates of the phrases and each of the partial character strings, specify the partial character strings where the ratio is within a predetermined ratio, calculate a phrase score indicating a value of a degree of importance of the candidate of the pattern used in specifying the candidate of the phrase or the amount of documents where the candidate of the phrase appears for each of the candidates of the phrases including the specified partial character strings to determine the calculation result as the phrase score of the partial character string, sort the partial character strings in the order of high phrase scores, and select the partial character string at a predetermined rank or more as the phrase of the output subject.

The phrase selecting unit may calculate a ratio of the number of the candidates of the phrases including the partial character strings with respect to a total number of the candidates of the phrases for each of the candidates of the phrases and each of the partial character strings, specify the partial character strings where the ratio is within a predetermined ratio, calculate a phrase score indicating a value of a degree of importance of the candidate of the pattern used in specifying the candidate of the phrase or the amount of documents where the candidate of the phrase appears for each of the candidates of the phrases including the specified partial character strings to determine the calculation result as the phrase score of the partial character string, sort the partial character strings in the order of high phrase scores, and select the partial character string at high ranks of a predetermined ratio as the phrase of the output subject.

The information extraction method may further include allowing a document searching unit to search a document, which includes all of a plurality of phrases selected from the input word list, from the plurality of documents, which include documents whose formats are different from each other and are stored in a storage device in advance. The pattern determining unit may determine a pattern for each of the documents, which are searched by the document searching unit.

The information extraction method may further include allowing a recreating unit to provide a list of the phrases selected by the phrase selecting unit as the input word list to the document searching unit.

The information extraction method may further include allowing a recreating unit to provide a list of the phrases selected by the phrase selecting unit as the input word list to the pattern determining unit.

Furthermore, an information extraction program according to the present invention is an information extraction program that is mounted in a computer and allows phrases in documents to be extracted from the documents and the phrases to be output. The information extraction program allowing the computer to execute: an input process that inputs an input word list including a plurality of phrases; a pattern determining process that selects one document from a plurality of documents including documents whose formats are different from each other, and determines a character string, which separates a phrase included in an input word list from a character string becoming a non-extraction subject in the selected document, as a pattern, for each of the documents; a phrase candidate extracting process that extracts a character string separated by a pattern from a document used in determining the pattern and determines the character string as a candidate of a phrase; and a phrase selecting process that selects a candidate of a phrase or a partial character string satisfying a predetermined condition as a phrase of an output subject among candidates of phrases extracted by the phrase candidate extracting process or partial character strings included in the candidates of the phrases.

Effect of the Invention

According to the present invention, it is possible to extract phrases of the same kind from a plurality of documents having various formats.

BRIEF DESCRIPTION OF THE DRAWINGS

FIG. 1 is a block diagram showing a first embodiment of an information extraction system according to the present invention;

FIG. 2 is a flowchart showing an example of the operation of a data processing device according to a first embodiment;

FIG. 3 is a diagram illustrating an example of a document group;

FIG. 4 is a diagram illustrating an example of a list of input words;

FIG. 5 is a diagram illustrating an example of a pattern candidate;

FIG. 6 is a diagram illustrating an example of a phrase candidate;

FIG. 7 is a diagram illustrating an example of a list of output words;

FIG. 8 is a flowchart showing an example of the operation according to a second embodiment;

FIG. 9 is a diagram illustrating an example of a document group;

FIG. 10 is a diagram illustrating a pattern candidate according to a second embodiment;

FIG. 11 is a diagram illustrating an example of a phrase candidate according to a second embodiment;

DESCRIPTION OF THE REFERENCE NUMERALS

Figure 12:
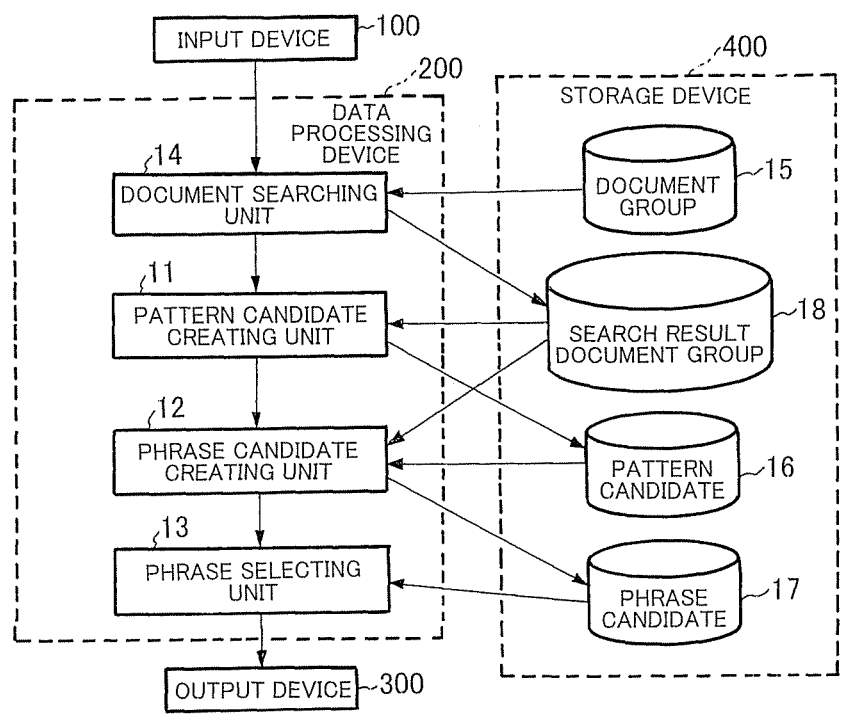
FIG. 12 is a block diagram showing a third embodiment of an information extraction system according to the present invention.

11: pattern candidate creating unit
12: phrase candidate creating unit
13: phrase selecting unit
14: document searching unit
15: document group
16: pattern candidate
17: phrase candidate
18: search result document group
19: recreating unit
100: input device
200: data processing device
300: output device
400: storage device
500: information extraction program

BEST MODE FOR CARRYING OUT THE INVENTION

Hereinafter, the preferred embodiments of the present invention will be described with reference to the accompanying drawings.

First Embodiment

FIG. 1 is a block diagram showing a first embodiment of an information extraction system according to the present invention. The information extraction system according to the first embodiment includes an input device 100, a data processing device 200 that operates under the control of a program, an output device 300, and a storage device 400 that stores information.

The input device 100 is an input device to which information is input. For example, a keyboard or a mouse is used as the input device 100.

The output device 300 is an output device that outputs information. For example, a display device or a printer is used as the output device 300.

The storage device 400 is a storage device, such as a hard disk, and stores a document group 15, a pattern candidate 16, and a phrase candidate 17.

The document group 15 includes a plurality of documents from which phrases are extracted. Specifically, the document group 15 is information that includes identification information (hereinafter, referred to as document ID) used to identify individual documents and individual document texts. A text of each document and each document ID are associated with each other.

The pattern candidate 16 is information that includes candidates of patterns determined by a pattern candidate creating unit 11. Specifically, the pattern candidate 16 is information that includes candidates of patterns, document IDs of documents used when determining the candidates of the patterns, and pattern scores. The pattern candidate creating unit 11 and the pattern score will be described in detail below. As described above, the "patterns" are character strings that are used to distinguish phrases included in a dictionary (phrases becoming extraction subjects) from phrases not included in the dictionary. The patterns include forward patterns that are located in front of targeted phrases and backward patterns that are located in the back of the targeted phrases. In this embodiment, the pattern candidate 16 includes forward pattern candidates (character strings that constitute candidates of the forward patterns) and backward pattern candidates (character strings that constitute candidates of the backward patterns), which serve as the candidates of the patterns.

The phrase candidate 17 is information that includes phrases that a phrase candidate creating unit 12 extracts from the document texts. Specifically, the phrase candidate 17 is information that includes candidates of phrases specified by the phrase candidate creating unit 12, document IDs, and pattern scores. The phrase candidate creating unit 12 will be described in detail below. As described above, the phrase is a word or a unity of a plurality of words. Also, the phrase may be not only a word but also a phrase composed of a plurality of words.

FIG. 1 shows the case where the document group 15, the pattern candidate 16, and the phrase candidate 17 are stored in the same storage device 400. However, the document group 15, the pattern candidate 16, and the phrase candidate 17 may be stored in a plurality of different storage devices, respectively. For example, a portion of the document group 15, the pattern candidate 16, and the phrase candidate 17 may be stored in an information processing device (not shown) that is connected to the data processing device 200 through a communication network, such as the Internet.

The data processing device 200 includes a pattern candidate creating unit 11, a phrase candidate creating unit 12, and a phrase selecting unit 13.

The pattern candidate creating unit 11 uses an input word input to the input device 100 as input data, and determines candidates of patterns from character strings in front of and in the back of an appearance location of the input word in documents while referring to the document group 15. In addition, the pattern candidate creating unit 11 stores candidates of patterns, document IDs of documents used when determining the candidates of the patterns, and pattern scores as the pattern candidate 16 in the storage device 400.

The input word is a phrase that is selected as a sample by a user of the information extraction system among phrases, which are to be included in a dictionary (list of phrases of the same kind) of a desired kind.

The pattern score is a score that indicates a degree of importance of a pattern or a candidate of a pattern. For, example, the pattern score is shown by a ratio of the number of input words divided by the candidates of the patterns with respect to the total number of all input words that appear in a document. In this embodiment, the pattern score is defined by a ratio of the number of input words interposed between forward pattern candidates and backward pattern candidates with respect to the number of all input words that appear in the document.

The phrase candidate creating unit 12 uses data included in the pattern candidate 16 as input data, and refers to the document group 15 to read out a document text corresponding to a document ID associated with candidates of patterns in the pattern candidate 16 from the document group 15. In addition, the phrase candidate creating unit 12 specifies appearance locations of the candidates of the patterns (in this embodiment, forward pattern candidates and backward pattern candidates) in the document text, and extracts character strings interposed between the forward pattern candidates and the backward pattern candidates from the document text. In this case, the extracted character strings constitute the candidates of the phrases. The phrase candidate creating unit 12 associates the candidates of the phrases, identification information (hereinafter, referred to as pattern ID) of the candidates of the patterns used when extracting the candidates of the phrases, and the pattern scores of the candidates of the patterns with each other, and stores the association result as the phrase candidate 17 in the storage device 400.

The phrase selecting unit 13 uses the phrase candidate 17 as the input data, selects a phrase satisfying a predetermined condition from the candidates of the phrases, and outputs the selected phrase to the output device 300. The phrase selecting unit 13 selects a phrase where large is a value of a degree of importance of the candidates of the patterns used when the candidates of the phrases are specified or a numerical value indicating the amount of documents where the candidates of the phrases appear.

Next, the operation will be described.

FIG. 2 is a flowchart showing an example of the operation of the data processing device 200 according to this embodiment.

The information extraction system previously stores the document group 15 in the storage device 400 before starting its operation. An example of the document group 15 is shown in FIG. 3. The document group 15 includes document IDs that are used to identify documents and document texts. In the document group 15, one record corresponds to one document. One record includes one document ID and a document text that corresponds to the document ID. In the example that is shown in FIG. 3, each document ID, such as a "document A", and a document text corresponding to each document ID are shown. A portion that is not shown in the drawing among the document text is represented by " . . . " in FIG. 3.

FIG. 3 shows an example of the document group 15. In this case, files that are managed by a file system or documents that can be obtained through the Internet may be stored as the document group 15 in the storage device 400. For example, a file path or a URL may be stored as the document ID, and data corresponding to the file path or the URL may be stored as the document text.

First, a user inputs a list of input words (hereinafter, referred to as input word list) to the input device 100 (refer to FIG. 1). The input word list is some phrases that are selected as samples by the user of the information extraction system among the phrases, which are to be included in a dictionary of a desired kind (a list of phrases of the same kind). That is, the input word list is phrases of the predetermined kind and number that the user desires to input. An example of the input word list is shown in FIG. 4. In the example that is shown in FIG. 4, an input word list of phrases that correspond to a predetermined kind, that is, a product name is shown.

The input device 100 transmits the input word list input by the user to the data processing device 200. That is, the input word list that is transmitted from the input device 100 is input to the data processing device 200. After the input word list is input, the data processing device 200 operates in accordance with the flowchart shown in FIG. 2.

First, the pattern candidate creating unit 11 extracts data corresponding to one record (one document ID and a document text corresponding to the document ID) from the document group 15, and specifies appearance locations of the input words in the document text (Step S1 shown in FIG. 2). In Step S1, the pattern candidate creating unit 11 specifies an appearance location of each of the input words that are included in the input word list. The data that is extracted in Step S1 is one record. Accordingly, the processes of Step S1 to Step S3 (which will be described in detail below) are executed for each document.

For example, in Step S1, the document text that corresponds to the document ID "document B" shown in FIG. 3 is selected and extracted. In a document text that corresponds to a document ID "document B", among the input word list shown in FIG. 4, a "product A", a "product B", and a "product C" appear. The pattern candidate creating unit 11 specifies an appearance location of each of the input words in the selected document text.

The appearance location is represented by a start location and a termination location of a character string of each of the input words, but may be represented by other representation methods. For example, the appearance location may be represented by a combination of a start location of a character string of each input word and a length of each input word. In this example, the appearance location may be represented by a start location and a termination location of a character string of each input word.

Next, the pattern candidate creating unit 11 acquires, from the document text, forward and backward character strings of the appearance location of each input word by the predetermined number of characters, and determines candidates of patterns (Step S2 shown in FIG. 2).

The pattern candidate creating unit 11 determines candidates of patterns as follows. That is, the pattern candidate creating unit 11 extracts command portions from the obtained forward character strings and determines the common portions as candidates of patterns (forward pattern candidates). It is preferable that at least two forward character strings be common as the common portions. However, it is assumed that the common portions are located immediately before the input word. In addition, even when all of the forward character strings corresponding to the obtained characters of the predetermined number are not common to the other forward character strings, the pattern candidate creating unit 11 determines all of the forward character strings corresponding to the predetermined number of characters as candidates of patterns (forward pattern candidates). In the same method, the pattern candidate creating unit 11 extracts command portions from the obtained backward character strings and determines the common portions as candidates of patterns (backward pattern candidates). It is preferable that at least two backward character strings be common as the common portions. However, it is assumed that the common portions are located immediately after the input word. In addition, even when all of the backward character strings corresponding to the obtained characters of the predetermined number are not common to the other backward character strings, the pattern candidate creating unit 11 determines all of the character strings corresponding to the predetermined number of characters as candidates of patterns (backward pattern candidates).

The number of characters (predetermined number of characters) of the character strings that are extracted in front of and in the back of the appearance location of the input word may be determined in advance. Alternatively, the number of characters may be input from the user through the input device 100 to the pattern candidate creating unit 11, and the pattern candidate creating unit 11 may determine the number of characters as the predetermined number of characters.

Exemplified is the case where the predetermined number of characters is "10", and the pattern candidate creating unit 11 determines the forward pattern candidates and the backward pattern candidates. In Step S1, it is assumed that a document text (refer to FIG. 3) corresponding to a document ID "document B" is selected. In the document text, a forward character string (character string corresponding to 10 characters) of the input word "product A" is [size="10">]. Similarly, a forward character string (corresponding to 10 characters) of the input word "product B" is [size="10">]. In addition, in the document text, an input word "product C" appears two times. Between them, a forward character string (corresponding to 10 characters) of one "product C" is [size="10">], and a forward character string (corresponding to 10 characters) of the other "product C" is [nt><p><b>•]. The pattern candidate creating unit 11 compares the forward character strings and extracts a character string that constitutes a common portion. In this example, among the input words that appear four times, [size="10">] is common in the three input words, and thus the pattern candidate creating unit 11 determines [size="10">] as the forward pattern candidate. In addition, in the entire character string [nt><p><b>•] that corresponds to 10 characters, [size="10">] is not common, but the pattern candidate creating unit 11 determines [nt><p><b>•] corresponding to 10 characters as the forward pattern candidate.

The backward pattern candidate is also determined, similar to the case of the forward pattern candidate. In the document text, a backward character string (corresponding to 10 characters) of the input word "product A" is [</font><br]. Similarly, a backward character string (corresponding to 10 characters) of the input word "product B" is [</font><br]. In the "product C" that appears two times, a backward character string (corresponding to 10 characters) of one "product C" is [</font> <p>], and a backward character string (corresponding to 10 characters) of the other "product C" is [category <b> <b]. The pattern candidate creating unit 11 compares the backward character strings and extracts a character string that constitutes a common portion. In this example, among the input words that appear four times, [</font> <] is common in the three input words, and thus the pattern candidate creating unit 11 determines [</font> <] as the forward pattern candidate. In addition, among the input words that appear four times, [</font> <br] is common in the two input words, and thus the pattern candidate creating unit 11 determines [</font> <br] as the backward pattern candidate. In addition, the entire character string [</font> <p>] that corresponds to 10 characters and the entire character string [category <b> <b] are not common to the other character strings, but the pattern candidate creating unit 11 determines the entire character string [</font> <p>] and the entire character string [category <b> <b] as the backward pattern candidates.

Next, the pattern candidate creating unit 11 calculates a pattern score on the basis of a combination of a forward pattern candidate group and a backward pattern candidate group, and stores the calculation result in the storage device 400 (Step S3 shown in FIG. 2). In Step S3, the pattern candidate creating unit 11 associates a pair of one forward pattern candidate and one backward pattern candidate, a pattern ID to identify the pair, a document ID of a document text (document text extracted in Step S1) used when determining a pattern candidate, and a pattern score, and stores the association result as the pattern candidate 16 in the storage device 400.

As describe above, the pattern score is a score that indicates a degree of importance of a pattern or a candidate of a pattern. In this embodiment, a pattern score is calculated for each of pairs of forward pattern candidates and backward pattern candidates. For example, the probability of a phrase interposed between a pair of a forward pattern candidate and a backward pattern candidate being an input word or a length of a character string of a pattern is considered as the pattern score. In this embodiment, the pattern score is defined as a ratio of the number of input words interposed between the forward and backward pattern candidates with respect to the total number of all input words that appear in a document. That is, the pattern candidate creating unit 11 may calculate "the number of input words interposed between the forward and backward pattern candidates/the number of all input words that appear in the document", thereby calculating the pattern score. The pattern score indicates the probability of a phrase interposed between a pair of a forward pattern candidate and a backward pattern candidate being an input word. If the number of input words that can be extracted by a pair of a forward pattern candidate and a backward pattern candidate is large, the corresponding pattern can be considered as an important pattern. Accordingly, in this embodiment, the pattern score is calculated, as described above.

Next, an example of calculating a pattern score using the forward pattern candidate and the backward pattern candidate described above will be described. For example, in a pair of a forward pattern candidate [size="10">] and a backward pattern candidate [</font> <], a "product A", a "product B", and a "product C" exist as input words that are interposed between the pair (refer to the "document B" that is shown in FIG. 3). Accordingly, the number of input words that are interposed between the forward pattern candidate and the backward pattern candidate is 3. In addition, since the "product C" appears two times in the document, the number of all of input words that appear in the "document B" is 4. Accordingly, the pattern candidate creating unit 11 calculates a pattern score as "3/4".

The pattern candidate creating unit 11 calculates a pattern score in the same method as the above-described method, with respect to the other pairs. In a pair of a forward pattern candidate [size="10">] and a backward pattern candidate [</font> <br], a pattern score is calculated as "2/4". In a pair of a forward pattern candidate [size="10">] and a backward pattern candidate [category<b> <b], a pattern score is calculated as "0/4".

In addition, the pattern candidate creating unit 11 allocates a pattern ID to a pair of a forward pattern candidate and a backward pattern candidate. The pattern candidate creating unit 11 associates a pattern ID, a document ID, a pair of a forward pattern candidate and a backward pattern candidate, and a pattern score with each other, and stores the association result as the pattern candidate 16 in the storage device 400. FIG. 5 is a diagram illustrating an example of the pattern candidate 16. As shown in FIG. 5, the pattern candidate 16 includes a pattern ID, a document ID, a forward pattern backward, a backward pattern candidate, and a pattern score. One record corresponds to a pair of a forward pattern candidate and a backward pattern candidate. In an example that is shown in FIG. 5, a record that is not shown in the drawing is represented by " . . . ". In addition, the above configuration exemplifies the case where, when the calculated pattern score is "0", the pattern candidate creating unit 11 does not store a record including the pattern score in the storage device 400. Even in FIG. 5, a record where a pattern score becomes "0" is not shown.

After Step S3, the pattern candidate creating unit 11 extracts all documents that are included in the document group 15, and determines whether or not the processes of Steps S1 to S3 are executed with respect to all the documents (Step S4 that is shown in FIG. 2). When there remains a document in which the processes of Steps S1 to S3 are not executed (Step S4: NO), the process proceeds to Step S1, and the processes starting from Step S1 are repeated. If the processes of Steps S1 to S3 are executed with respect to all the documents, the process proceeds to Step S5.

In Step S5, the phrase candidate creating unit 12 extracts one record from the pattern candidate 16 that is stored in the storage device 400, and specifies appearance locations of a forward pattern candidate and a backward pattern candidate in a document text that corresponds to a document ID (Step S5 that is shown in FIG. 2). First, in Step S5, the phrase candidate creating unit 12 extracts one record from the pattern candidate 16. In addition, the phrase candidate creating unit 12 reads out a document text, which corresponds to a document ID included in the corresponding record, from the document group 15. The phrase candidate creating unit 12 specifies appearance locations of a forward pattern candidate and a backward pattern candidate that are included in the extracted record, in the document text.

Next, the operation of the phrase candidate creating unit 12 in Step S5 will be described on the basis of the case where the phrase candidate creating unit 12 extracts a second record of the pattern candidate 16 shown in FIG. 5. The data of the second record that is exemplified in FIG. 5 includes a 'document B" as a document ID. In addition, the data of the second record includes [size="10"] as a forward pattern candidate and [</font> <] as a backward pattern candidate. Accordingly, the phrase candidate creating unit 12 reads out a document text corresponding to the "document B" from the document group 15, which is included in the storage device 400. In addition, the phrase candidate creating unit 12 specifies an appearance location of the forward pattern candidate [size="10"] and an appearance location of the backward pattern candidate [</font><] in the document text.

After Step S5, on the basis of the appearance location of the forward pattern candidate and the appearance location of the backward pattern candidate, the phrase candidate creating unit 12 extracts a character string, which is interposed between the forward pattern candidate and the backward pattern candidate, as a candidate of a phrase. In addition, the phrase candidate creating unit 12 associates the extracted candidate of the phrase, a document ID of a document from which the candidate of the phrase is extracted, a pattern ID of a candidate (pair of a forward pattern candidate and a backward pattern candidate) of a pattern used when the candidate of the phrase is extracted, and a pattern score thereof with each other, and stores the association result as the phrase candidate 17 in the storage device 400 (Step S6 that is shown in FIG. 2).

However, the phrase candidate creating unit 12 extracts a candidate of a phrase from a document text so as to satisfy the following condition: "the appearance location of a character string that constitutes the candidate of the phrase does not include an appearance location of a forward pattern candidate and an appearance location of a backward pattern candidate". That is, the character string of the candidate of the phrase that is extracted from the document text does not include the forward pattern candidate or the backward pattern candidate. For example, in the document text that corresponds to the document ID "document B" that is included in the second record of the pattern candidate 16 exemplified in FIG. 5, a character string of [product B</font> <br> <font size="10">product A] exists as a character string that is interposed between the forward pattern candidate [size="10">] and the backward pattern candidate [</font><]. The appearance location of the character string also includes an appearance location of the backward pattern candidate [</font><]. Accordingly, the phrase candidate creating unit 12 does not adopt the above character string as the candidate of the phrase.

In addition, the phrase candidate creating unit 12 does not adopt the same character string as the input word as the candidate of the phrase. Accordingly, the same character string as the input word is not stored as the phrase candidate 17.

The phrase candidate creating unit 12 associates the candidate of the phrase extracted in the above-described way, a document ID of a document from which the candidate of the phrase is extracted, a pattern ID of a candidate (pair of a forward pattern candidate and a backward pattern candidate) of a pattern used when extracting the candidate of the phrase, and a pattern score thereof with each other, and stores the association result as the phrase candidate 17 in the storage device 400. FIG. 6 is a diagram illustrating an example of the phrase candidate 17. As shown in FIG. 6, the phrase candidate 17 includes document IDs, character strings (candidates of phrases) extracted from document texts, pattern IDs, and pattern scores. One record in the phrase candidate 17 corresponds to a candidate of one phrase.

After Step S6, the phrase candidate creating unit 12 determines whether or not the processes of Steps S5 and S6 are executed with respect to all records (all pattern candidates) that are included the pattern candidate 16 (Step S7 that is shown in FIG. 2). When a record where the processes of Steps S5 and S6 are not executed remains in the pattern candidate 16 (Step S7: NO), the process proceeds to Step S5, and the processes starting from Step S5 are repeated. If the processes of Steps S5 and S6 are executed with respect to all of the records of the pattern candidate 16 (Step S7: YES), the process proceeds to Step S8.

In Step S8, the phrase selecting unit 13 refers to the phrase candidate 17 to select a candidate of a phrase extracted from a document, and calculates a phrase score of the candidate of the phrase (Step S8 that is shown in FIG. 2). In Step S8, first, the phrase selecting unit 13 extracts a record where a character string of the candidate of the phrase is the same from the phrase candidate 17, and calculates a phrase score of a candidate of a phrase that is common to the extracted record. The phrase score is a value that indicates a degree of importance of a candidate of a pattern used when specifying the candidate of the phrase or a numerical value that indicates the amount of documents where the candidate of the phrase appears. If a value of the phrase score is large, this means that a degree of importance of the candidate of the pattern is high and the number of documents where the candidate of the phrase appears is large. The phrase score may be an average value or a total value of pattern scores that are included in records where a character string of a candidate of a phrase is the same. In addition, the phrase score may be the number of kinds of document IDs that are included in records where the character string of the candidate of the phrase is the same. However, they are only examples of the phrase score, and other calculation values may be used as the phrase score. Here, a description is given to the case where the phrase selecting unit 13 classifies records of which a character string of a candidate of a phrase is the same and which is obtained from the phrase candidate 17, on the basis of document IDs, calculates an average value of pattern scores for each of the document IDs, and uses a total value of the average values calculated for each of the document IDs as the phrase score. In a calculation method of the phrase score, an average value of the pattern scores is calculated for each of the document IDs in consideration of the case where candidates of phrases in one document appear many times. In addition, in order to allocate a score having a large value to each of the candidates of the phrases that appear in a plurality of documents, a total value of average values of pattern scores that are calculated for each of the document IDs is used as the phrase score.

For example, a phrase score of the "product D" as the phrase candidate that is included in the phrase candidate 17 shown in FIG. 6 is calculated as follows. The candidate of the phrase is the "product D", the number of records whose document ID is a "document A" is only one, and a pattern score thereof is "3/3". The candidate of the phrase is the "product D", the number of records whose document ID is a "document B" is two, and pattern scores thereof are "3/4" and "2/4", respectively. An average value of the pattern scores is "(3/4+2/4)/2". The candidate of the phrase is the "product D", the number of records whose document ID is the "document D" is only one, and a pattern score thereof is "2/2". Accordingly, the phrase selecting unit 13 calculates the phrase score as "3/3+(3/4+2/4)/2+2/2=2.625".

Next, the phrase selecting unit 13 determines whether or not the process of Step S8 is completed with respect to all of the records of the phrase candidate 17 (Step S9 that is shown in FIG. 2). When there remains a record in which the process of Step S8 is not executed, that is, there remains a record that is not selected by Step S8 (Step S9: NO), the process proceeds to Step S8, and the processes starting from Step S8 are repeated. When the process of Step S8 is completed with respect to all records of the phrase candidate 17 (Step S9: YES), the process proceeds to Step S10.

In Step S10, the phrase selecting unit 13 selects candidates of phrases to be output, on the basis of the phrase score (Step S10 that is shown in FIG. 2). As a method of selecting candidate of phrases to be output, there is a method of selecting candidates of phrases where a value of a phrase score is equal to or larger than a predetermined threshold value. Also, there is a method in which candidates of phrases are sorted in the order of high phrase scores and candidates of phrases at the predetermined rank or more are selected. In addition, candidates of phrase may be sorted in the order of high phrase scores, and candidates of phrases at high ranks of a predetermined ratio may be selected. In this embodiment, exemplified is the case where the candidates of the phrases are sorted in the order of high phrase scores and candidates of the phrases at high ranks of the predetermined ratio are selected. In this case, the phrase selecting unit 13 selects candidates of phrases of higher 10% that have high phrase scores. Here, the higher 10% is exemplified as the predetermined ratio, but the predetermined ratio may not be 10%. In addition, the predetermined threshold value, the predetermined order, and the predetermined ratio in the above-described selection methods may be determined in advance. Alternatively, the predetermined threshold value, the predetermined rank, and the predetermined ratio may be input from the user through the input device 100.

As such, if the candidates of the phrases having the high phrase scores are selected, the phrases that appear in a large amount of documents or the phrases that are extracted by the patterns where a degree of importance is high may be selected.

As described above, an average value or a total value of pattern scores, which are included in records where a character string of a candidate of a phrase is the same, may be used as a phrase score. Alternatively, an average value of the number of characters of candidates of patterns (forward pattern candidates and backward pattern candidates in this embodiment), which are specified by pattern IDs included in records where a character string of a candidate of a phrase is the same, may be used as a phrase score. As such, even when the phrase score is calculated, the candidates of the phrases to be output may be selected as described above. For example, candidates of phrases where a value of a phrase score is equal to or larger than the predetermined threshold value may be selected. Alternatively, candidates of phrases may be sorted in the order of high phrase scores and the candidates of the phrases at the predetermined rank or more may be selected. Alternatively, the candidates of the phrases may be sorted in the order of high phrase scores and the candidates of the phrases at high ranks of a predetermined ratio may be selected.

Finally, the phrase selecting unit 13 outputs a set of selected candidates of the phrases as an output word list to the output device 300 (for example, display output or printing output). The output word is the candidate of the phrase that is selected in Step S10. An example of the output word list is shown in FIG. 7. FIG. 7 shows the case where selected candidates of phrases and phrase scores thereof are output.

The user of the information extraction system may create a dictionary that includes output words included in the output word list and input words input by the user. In addition, the user may refer to a phrase score corresponding to each output word to inspect whether or not to include each output word in the dictionary.

Next, an effect of this embodiment will be described.

In this embodiment, the pattern candidate creating unit 11 extracts an individual document from the document group 15, determines a candidate of a pattern from each document text, and uses the candidate of the pattern to extract a candidate of a phrase from the document. Accordingly, it is possible to extract the phrase without depending on the document format. That is, even when various documents having various document formats are included in the document group 15, it is possible to extract a phrase of the same kind as an input word from each document.

Further, in this embodiment, using the candidates of the patterns that are determined by the pattern candidate creating unit 11, the phrase candidate creating unit 12 extracts the candidates of the phrases, and the phrase selecting unit 13 selects the candidates of the phrases on the basis of the phrase scores. In addition, the selected candidate of the phrase is output as an output word. Accordingly, it is possible to secure reliability of the output phrase.

Second Embodiment

An information extraction system according to a second embodiment is almost the same as the information extraction system according to the first embodiment, and thus may have the same configuration as that shown in FIG. 1. However, the process contents of the pattern candidate creating unit 11, the phrase candidate creating unit 12, and the phrase selecting unit 13 in the second embodiment are different from those in the first embodiment.

In the second embodiment, the pattern candidate creating unit 11 determines only a forward pattern candidate or a backward pattern candidate. That is, in this embodiment, the pattern candidate creating unit 11 determines only a forward pattern candidate or a backward pattern candidate as a candidate of a pattern.

In addition, in the second embodiment, the phrase candidate creating unit 12 creates the phrase candidate 17 on the basis of only the forward pattern candidate or the backward pattern candidate. Accordingly, it is possible to realize a process that considers only the forward pattern candidate or a process that considers only the backward pattern candidate.

In the second embodiment, a character string that constitutes a candidate of a phrase is determined on the basis of only the forward pattern candidate or the backward pattern candidate, thereby removing an unnecessary suffix or prefix. The unnecessary prefix or suffix is a symbol, such as "*" or "#", which is given to call an attention in the document text.

In the second embodiment, the unnecessary suffix or prefix can be removed using only the forward pattern candidate or the backward pattern candidate, thereby improving reliability of an output word.

Next, the operation according to this embodiment will be described. FIG. 8 is a flowchart showing an example of the operation according to this embodiment. The flowchart that is shown in FIG. 8 is different from the flowchart (refer to FIG. 2) that shows the operation according to first embodiment as follows. That is, the processes of Steps S2, S3, S5, S6, and S8 that are shown in FIG. 2 are replaced by the processes of Steps S21, S31, S51, S61, and S81. The processes of Steps S21, S31, S51, S61, and S81 will be described in detail below.

In the description below, the process contents that are different from those of the first embodiment are described in detail, and a description of the same processes as the first embodiment is omitted. In addition, in the following example, only a forward pattern candidate is used as a candidate of a pattern, but the same effect may be achieved even in the case where only a backward pattern candidate is used as the candidate of the pattern. The data processing device 200 may hold information that indicates which of the forward pattern candidate and the backward pattern candidate is used as the candidate of the pattern, and may use only the forward pattern candidate or the backward pattern candidate as the candidate of the pattern on the basis of the corresponding information. Alternatively, information that indicates which of the forward pattern candidate and the backward pattern candidate is used as the candidate of the pattern may be input from the user through the input device 100, and the data processing device 200 may use only the forward pattern candidate or the backward pattern candidate on the basis of the corresponding information.

In Step S21 after Step S1, the pattern candidate creating unit 11 determines only the forward pattern candidate or the backward pattern candidate. The operation that determines the forward pattern candidate and the operation that determines the backward pattern candidate are the same as those of the first embodiment.

For example, it is assumed that the storage device 400 (refer to FIG. 1) stores a document group, which is shown in FIG. 9, as the document group 15, and in Step S1, the document text (refer to FIG. 3) that corresponds to the document ID "document B" is selected. FIG. 9 is a diagram illustrating an example of the document group 15. The document group 15 that is exemplified in FIG. 9 is different from the document group that is exemplified in FIG. 3 in that a character "*" is added after a character string "product D" in the document text that corresponds to the "document B". In addition, in the same method as the case exemplified in the first embodiment, it is assumed that the input word list that is exemplified in FIG. 4 is input as the input word list. This embodiment exemplifies the case where the pattern candidate creating unit 11 determines only the forward pattern candidate. The operation that determines the forward pattern candidate is the same as that of the first embodiment. Accordingly, the pattern candidate creating unit 11 extracts [size="10">] and [nt> <p> <b>•] from the document text that corresponds to the "document B", and determines the two character strings as the forward pattern candidates.

After Step S21, the pattern candidate creating unit 11 calculates the pattern score and stores the calculation result in the storage device 400 (Step S31). In the second embodiment, the pattern candidate creating unit 11 calculates a pattern score from only the forward pattern candidate or the backward pattern candidate. In this embodiment, when the pattern score is calculated from only the forward pattern candidate, the pattern score may be a ratio of the number of forward pattern candidates appearing in front of the input word appearance location with respect to the total number of all input words that appear in a document. That is, the pattern candidate creating unit 11 may calculate "the number of forward pattern candidates appearing in front of the input word appearance location/the number of all input words that appear in the document and calculate a pattern score. In addition, when the pattern candidate is calculated from only the backward pattern candidate, the pattern score may be a ratio of the number of backward pattern candidates appearing in the back of the input word appearance location with respect to the total number of all input words that appear in a document. That is, the pattern candidate creating unit 11 may calculate "the number of backward pattern candidates appearing in the back of the input word appearance location/the number of all input words that appear in the document" and calculate a pattern score.

Here, the case where a pattern score is calculated from only a forward pattern candidate is exemplified. For example, if referring to the document text that corresponds to the document ID "document B", the number of times of appearance of the forward pattern candidate [size="10">] in front of the input words of the "product A", the "product B", and the "product C" is 3. In addition, in the document text, the input words "product A", "product B", and "product C" appear four times. Accordingly, the pattern candidate creating unit 11 calculates a pattern score of [size="10">] as "3/4". The pattern candidate creating unit 11 calculates a pattern score in the same method as the above method, with respect to the other forward pattern candidates.

The pattern candidate creating unit 11 allocates a pattern ID to each forward pattern candidate (each backward pattern candidate in the case where a process is executed using only the backward pattern candidate). In addition, the pattern candidate creating unit 11 associates the pattern ID, the forward pattern candidate (or backward pattern candidate), a document ID of the document text used when determining the forward pattern candidate (or backward pattern candidate), and a pattern score with each other, and stores the association result as the pattern candidate 16 in the storage device 400. FIG. 10 is a diagram illustrating an example of the pattern candidate 16 according to the second embodiment. As shown in FIG. 10, the pattern candidate 16 according to this embodiment includes pattern IDs, document IDs, forward pattern candidates, and pattern scores. One record corresponds to one forward pattern candidate. When only the backward pattern candidate is determined in Step S21, the pattern candidate 16 according to this embodiment includes the backward pattern candidates instead of the forward pattern candidates.

After Step S31, in the same method as the first embodiment, the determination process of Step S4 is executed. If the processes of Steps S1, S21, and S31 are executed with respect to all of the documents that are included in the document group 15, the process proceeds to Step S51.

In Step S51, the phrase candidate creating unit 12 extracts one record from the pattern candidate 16 that is stored in the storage device 400, and specifies the appearance location of a forward pattern candidate in a document text that corresponds to a document ID (Step S51). However, when the process is executed using only the backward pattern candidate (that is, the case where only the backward pattern candidate is determined in Step S21), the phrase candidate creating unit 12 specifies the appearance location of each backward pattern candidate.

After Step S51, the phrase candidate creating unit 12 specifies a candidate of a phrase (Step S61). When only the forward pattern candidate is determined in Step S21, following the forward pattern candidate, the phrase candidate creating unit 12 specifies a character string that has characters of the predetermined number as the candidate of the phrase. In addition, when only the backward pattern candidate is determined in Step S21, the phrase candidate creating unit 12 specifies a character string that has characters of the predetermined number immediately before the backward pattern candidate as the candidate of the phrase. The predetermined number of characters may be determined in advance. Alternatively, the number of characters may be input from the user through the input device 100, and the phrase candidate creating unit 12 may determine the number of characters as the predetermined number of characters.

For example, exemplified is the case where the predetermined number of characters is 6, and the candidate of the phrase is specified using a forward pattern candidate that is included in the second record of the pattern candidate 16 shown in FIG. 10. A document ID that is included in the second record of the pattern candidate 16 shown in FIG. 10 is a "document B". Accordingly, the phrase candidate creating unit 12 extracts a character string corresponding to six characters as the candidate of the phrase, following the forward pattern candidate [size="10">] in the document text of the "document B", and determines the extracted character string as the candidate of the phrase. That is, the phrase candidate creating unit 12 extracts [product D*</] from the document text of the "document B", and determines the extracted [product D*</] as the candidate of the phrase.

However, the phrase candidate creating unit 12 does not adopt a character string including an input word immediately after the forward pattern candidate (or immediately before the backward pattern candidate) as the candidate of the phrase.

The phrase candidate creating unit 12 associates the specified candidate of the phrase, a document ID of a document from which the candidate of the phrase is extracted, a pattern ID of a candidate of a pattern (forward pattern candidate or backward pattern candidate) used when specifying the phrase, and a pattern score thereof with each other, and stores the association result as the phrase candidate 17 in the storage device 400. FIG. 11 shows an example of the phrase candidate 17 according to this embodiment. The phrase candidate 17 according to this embodiment includes document IDs, candidates of phrases, pattern IDs, and pattern scores, in the same method as the case of the first embodiment. One record in the phrase candidate 17 corresponds to a candidate of one phrase. However, in this embodiment, the number of characters of a candidate of each phrase is the predetermined number of characters (in this example, 6), and an unnecessary suffix or tag character string is added.

After Step S61, in the same method as the first embodiment, if the determination process of Step S7 is executed and the processes of Steps S51 and S61 are executed with respect to all records of the pattern candidate 16 (refer to FIG. 10), the process proceeds to Step S81.

In Step S81, the phrase selecting unit 13 refers to the phrase candidate 17 to select a candidate of a phrase, and calculates a phrase score of the candidate of the phrase (Step S81). In Step S81, first, the phrase selecting unit 13 extracts one record from the phrase candidate 17. The phrase selecting unit 13 creates a partial character string of a candidate of a phrase that is included in the corresponding record. In the case of a candidate of a phrase that is determined from the forward pattern candidate, the phrase selecting unit 13 creates a partial character string that is composed of only a head character of the candidate of the phrase, a partial character string that is composed of the head character and a character immediately after the head character, . . . , and a partial character string that is composed of characters from the head character to the final character. In the case of a candidate of a phrase that is determined from the backward pattern candidate, the phrase selecting unit 13 creates a partial character string that is composed of only the final character of the candidate of the phrase, a partial character string that is composed of the final character and a character immediately before the final character, . . . , and a partial character string that is composed of characters from the final character to the head character. Next, the phrase selecting unit 13 refers to the phrase candidate 17 to search a record including the created partial character string. In addition, the phrase selecting unit 13 determines whether or not a ratio of the number of records including the partial character strings with respect to the number of all records is within a predetermined range. The phrase selecting unit 13 executes a determination process on each of the created partial character strings, and determines the partial character strings where the ratio of the number of records including the partial character strings with respect to the number of all records is within the predetermined range as calculation subjects of the phrase scores. In this case, information that indicates the predetermined range may be held in advance by the phrase candidate selecting unit 13. Alternatively, the information that indicates the predetermined range may be input from the user through the input device 100 and the phrase selecting unit 13 may execute the determination process on the basis of the predetermined range. The predetermined ratio is preferably in a range of, for example, 20% to 40%, but the present invention is not limited thereto.

The phrase selecting unit 13 extracts the record including the partial character string determined as the determination subject of the phrase score from the phrase candidate 17 (refer to FIG. 11), and calculates the phrase score of the partial character string. The calculation of the phrase score may be performed in the same method as the calculation that is described in the first embodiment.

The specific example of Step S81 will be described on the basis of the case where a first record of the phrase candidate 17 exemplified in FIG. 11 is extracted. In this case, the phrase selecting unit 13 creates partial character strings on the basis of a phrase candidate "product D</t", and obtains six partial character strings including "manufactured", "product", "product D", "product D<", "product D</]", and "product D</t". The phrase selecting unit 13 searches a record including each partial character string. In regards to the partial character strings "manufactured" and "product", the phrase selecting unit 13 searches eight records including first, second, third, fourth, fifth, eighth, ninth, and tenth records from the phrase candidate 17 shown in FIG. 11. In regards to the partial character string "product D", the phrase selecting unit 13 searches three records including first, fourth, and ninth records. In regards to each of the partial character strings [product D<], [product D</], and [product D</t], the phrase selecting unit 13 searches one record that corresponds to the fourth record. In addition, the phrase selecting unit 13 determines the partial character strings where a ratio of the number of records including partial character strings with respect to the number of all records is within the predetermined range (in this example, a range of 20% to 40%) as calculation subjects of phrase scores. In the example that is shown in FIG. 11, since the number of all records is 10, the phrase selecting unit 13 determines the "product D" as a calculation subject of a phrase score.

The phrase selecting unit 13 extracts records (three records including the first, fourth, and ninth records) including the partial character string "product D" from the phrase candidate 17, and calculates a phrase score. This exemplifies the case where, in the same method as the specific example that is shown in the first embodiment, the phrase selecting unit 13 sorts records on the basis of document IDs, calculates an average value of pattern scores for each of the document IDs, and determines a total value of average values calculated for each of the document IDs as a phrase score. The phrase selecting unit 13 calculates the phrase score as "3/3+3/4+2/2=2.75".

In Step S9, the phrase selecting unit 13 individually extracts all records included in the phrase candidate 17 and determines whether or not the process of Step S81 is completed. If all the records are not completely extracted (Step S9: NO), the process proceeds to Step S81 and the processes starting from Step S81 are repeated. If the process of Step S81 is completed with respect to all of the records (Step S9: YES), the process proceeds to Step S10.

In Step S10, the phrase selecting unit 13 selects a phrase from the character strings (partial character strings of the candidates of the phrases) that are determined as the calculation subjects of the phrase scores (Step S10). A method of selecting a phrase in Step S10 is the same as that of the first embodiment. For example, the phrase selecting unit 13 may select the partial character string where a value of the phrase score is equal to or larger than the predetermined threshold value. In addition, the phrase selecting unit 13 may sort the partial character strings in the order of high phrase scores, and select the partial character strings at the predetermined rank or more. For example, the phrase selecting unit 13 may sort the partial character strings in the order of high phrase scores, and select the partial character string at high ranks of a predetermined ratio (for example, partial character strings at higher 10%). In the above selection methods, the predetermined threshold value, the predetermined rank, and the predetermined ratio may be determined in advance. Alternatively, the predetermined threshold value, the predetermined rank, and the predetermined ratio may be input from the user through the input device 100.

Finally, in the same method as the first embodiment, the phrase selecting unit 13 outputs an output word list to the output device 300 (for example, display output or printing output).

The user of the information extraction system may create a dictionary that includes output words included in the output word list and input words input by the user. In addition, the user may refer to a phrase score that corresponds to each output word to inspect whether or not to include the individual output words in the dictionary.

In the above-described specific example, the description is given to the case where only the forward pattern candidate is determined in Step S21 and the forward pattern candidate is used. The same effect is achieved even in the operation of the case where only the backward pattern candidate is determined in Step S21 and the backward pattern candidate is used.

Next, an effect of the second embodiment will be described. In the second embodiment, only the forward pattern candidate or the backward pattern candidate is used as the candidate of the pattern. Accordingly, even though an extra character string (for example, an unnecessary suffix or prefix) is added in front of or in the back of a character string becoming an output word, this extra character string can be removed. In addition, in the same method as the first embodiment, the phrase can be extracted without depending on the document format. That is, even when various documents having various document formats are included in the document group 15, it is possible to extract a phrase of the same kind as an input word from each document. In addition, it is possible to secure reliability of the output phrase.

Third Embodiment

FIG. 12 is a block diagram showing a third embodiment of an information extraction system according to the present invention. The same constituent elements as those of the first embodiment are denoted by the same reference numerals as those of FIG. 1, and the repetitive description is omitted. In the third embodiment, a data processing device 200 includes a document searching unit 14, in addition to a pattern candidate creating unit 11, a phrase candidate creating unit 12, and a phrase selecting unit 13. In addition, a storage device 400 stores a search result document group 18, in addition to a document group 15, a pattern candidate 16, and a phrase candidate 17.

The document searching unit 14 receives an input word list from the input device 100, selects a plurality of input words from the input word list, and searches a document text including the selected input word group and a document ID thereof from the document group 15. The document searching unit 14 stores a pair of the searched document text and the document ID thereof as the search result document group 18 in the storage device 400.

The search result document group 18 is a search result that is obtained when the document searching unit 14 performs a search operation on the document group 15. Similar to the document group 15, the search result document group 18 includes a document ID and a document text. The pattern candidate creating unit 11 reads out each record from the search result document group 18 and creates the pattern candidate 16. In addition, the phrase candidate creating unit 12 reads out each record from the search result document group 18 and creates the phrase candidate 17.

By this configuration, in consideration of an easy unity of phrases of the same kind in a document, a document that constitutes a phrase extraction subject can be effectively selected from the document group 15. In addition, in the following processes, the processes are executed using a document selected from the document group 15, not the document group 15. Therefore, it is possible to create an output word list that includes phrases of the same kind and has high reliability.

In general, the phrases of the same kind frequently appear in the same document. For example, a "company name" is exemplified as the kind of phrases. As compared to the document where the company name appears once, the company name may appear many times between the same patterns, such as the list format or the table format, in the document where the company name appears many times. Accordingly, with respect to only this document, the pattern candidate 16 is created and the phrase candidate 17 is created, thereby lowering the possibility of extracting phrases other than the company name. Thus, if the document where a plurality of input words appear in the same document is searched in advance, it is possible to create an output word list having high reliability on the basis of only a document where the same phrase appears.

In the third embodiment, the document searching unit 14 selects a plurality of input words from the input word list, and searches a document including all of the selected input words from the document included in the document group 15. In addition, the pattern candidate creating unit 11 and the phrase candidate creating unit 12 execute a process using the searched document (that is, search result document group 18). As a result, it is possible to improve reliability of the output word list.

Next, an example of a process progress in this embodiment will be described. In the same method as the first embodiment, the information extraction system previously stores the document group 15 in the storage device 400 before starting its operation. In addition, the input word list is input to the input device 100 from the user. The input device 100 transmits the input word list, which is input from the user, to the data processing device 200. That is, the data processing device 200 receives the input word list from the input device 100.

If receiving the input word list from the input device 100, the document searching unit 14 of the data processing device 200 selects a plurality of input words from the input word list. The number of input words that the document searching unit 14 selects from the input word list may be previously stored in the document searching unit 14. Alternatively, the number of input words to be selected may be input to the document searching unit 14 from the user through the input device 100. The number of input words that the document searching unit 14 selects from the input word list is preferably 3, but not limited to 3. However, the number of selected input words needs to be determined as 2 or more, such that the plurality of input words are selected from the input word list.

When selecting the predetermined number of input words, preferably, the document searching unit 14 randomly selects the predetermined number of input words from the input word list. However, the present invention is not limited to the above selection method. For example, the input words may be selected in the order of input words of which the number of times of appearance is large in the document group 15.

Next, the document searching unit 14 refers to the document group 15 to search a document including the entire selected input word group (a plurality of input words), and stores the searched document as the search result document group 18 in the storage device 400. That is, the document searching unit 14 searches a document text including all of the plurality of selected input words and a document ID thereof from the document group 15, and stores the searched document ID and the searched document text as the search result document group 18 in the storage device 400.

Next, the document searching unit 14 determines whether the sufficient search result document group 18 is obtained or not. When it is determined that the sufficient search result document group 18 is not obtained, the document searching unit 14 repeats a process of reselecting a plurality of input words from the input word list, searching a document including all of the plurality of input words from the document group 15, and adding the searched result to the search result document group 18.

For example, when the number of times of selection of the plurality of input words from the input word list reaches the predetermined number, the document searching unit 14 may determine that the sufficient search result document group 18 is obtained. In contrast, when the number of times of selection of the plurality of input words is less than the predetermined number, the document searching unit 14 may determine that the sufficient search result document group 18 is not obtained.

Alternatively, when the number of documents (the number of records) that are included in the search result document group 18 reaches the predetermined number, the document searching unit 14 may determine that the sufficient search result document group 18 is obtained. In contrast, when the number of documents that are included in the search result document group 18 is less than the predetermined number, the document searching unit 14 may determine that the sufficient search result document group 18 is not obtained. Here, the two kinds of determination methods are exemplified, but it is preferable that the document searching unit 14 perform a determination using the determination method of the latter (determination method based on the number of documents that are included in the search result document group 18). It is possible to further increase the number of documents that are included in the search result document group 18. As a result, it is possible to improve reliability of the phrase that is extracted from the document. The information of the threshold value that is used to determine whether the sufficient search result document group 18 is obtained or not may be previously held by the document searching unit 14. Alternatively, the information may be input to the document searching unit 14 from the user through the input device 100.

When it is determined by the document searching unit 14 that the sufficient search result document group 18 is obtained, the pattern candidate creating unit 11 of the data processing device 200 executes the same processes as the processes of Steps S1 to S4 (refer to FIG. 2) in the first embodiment. However, the pattern candidate creating unit 11 extracts data corresponding to one record (one document ID and a document text corresponding to the document ID) from the search result document group 18, not the document group 15, and executes the same processes as the processes of Steps S1 to S4. In addition, the pattern candidate creating unit 11 determines whether the processes of Steps S1 to S3 are executed with respect to all of the documents included in the search result document group 18, in Step S4. When it is determined that a document that is not subjected to the processes of Steps S1 to S3 remains in the search result document group 18, the process proceeds to Step S1 and the processes starting from Step S1 are repeated.

If the processes of Steps S1 to S3 are executed with respect to all of the documents that are included in the search result document group 18, the phrase candidate creating unit 12 executes the same processes as the processes of Steps S5 to S7 in the first embodiment. However, when reading out a document text that corresponds to a document ID that is included in a record of the pattern candidate 16, the phrase candidate creating unit 12 reads out the document text from the search result document group 18, not the document group 15.

If the processes of Steps S5 and S6 are executed with respect to all of the records of the pattern candidate 16 (Step S7: YES), the phrase selecting unit 13 executes the same processes as the processes starting from Step S8 in the first embodiment.

The user of the information extraction system may create a dictionary that includes output words included in the output word list and input words input by the user. In addition, the user may refer to a phrase score corresponding to each output word to inspect whether or not to include the individual output words in the dictionary.

Next, an effect of the third embodiment will be described. In this embodiment, using the characteristic of the phrase of the same kind frequently appearing in the same document, the document searching unit 14 searches a document including a plurality of input words from the document group 15 and stores the searched result as the search result document group

18 in the storage device. In addition, the pattern candidate creating unit 11 and the phrase candidate creating unit 12 use the search result document group 18 instead of the document group 15 to execute the same processes as those of the first embodiment. Accordingly, the processes are executed with respect to only the document where the possibility of the phrase of the same kind appearing is high, and thus the phrase having high reliability can be output. In addition, it is possible to obtain the same effect as the first embodiment.

In addition, in the third embodiment, the pattern candidate creating unit 11, the phrase candidate creating unit 12, and the phrase selecting unit 13 may perform the same operation as the second embodiment (however, using the search result document group 18 instead of the document group 15). In this case, it is possible to obtain the same effect as the second embodiment.

Fourth Embodiment

Figure 13:
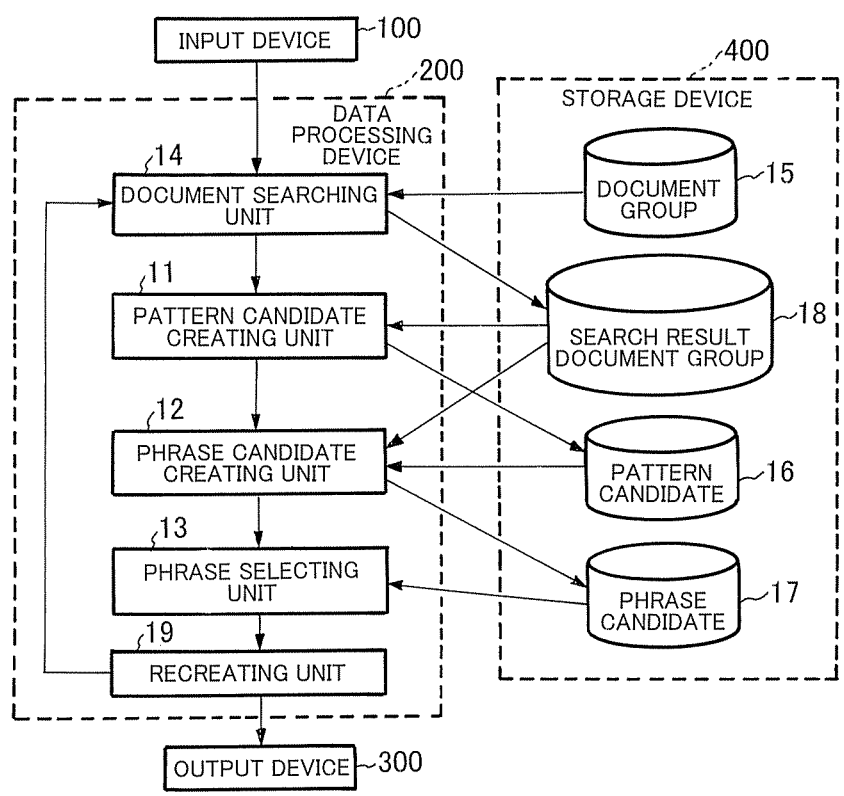
FIG. 13 is a block diagram showing a fourth embodiment of an information extraction system according to the present invention.

FIG. 13 is a block diagram showing a fourth embodiment of an information extraction system according to the present invention. The same constituent elements as the third embodiment are denoted by the same reference numerals as those of FIG. 12 and the repetitive description is omitted. In the fourth embodiment, a data processing device 200 includes a recreating unit 19, in addition to a pattern candidate creating unit 11, a phrase candidate creating unit 12, a phrase selecting unit 13, and a document searching unit 14.

The recreating unit 19 recreates an input word list on the basis of the output word list. Specifically, the recreating unit 19 receives the output word list from the phrase selecting unit 13, and transmits a set of output words included in the output word list as an input word list to the document searching unit 14. At this time, the recreating unit 19 deletes the search result document group 18, the pattern candidate 16, and the phrase candidate 17, which are stored in the storage device 400. That is, when the output word list received by the recreating unit 19 is created, the recreating unit 19 deletes the search result document group 18, the pattern candidate 16, and the phrase candidate 17, which are stored in the storage device 400.

In addition, the recreating unit 19 accumulates therein a copy of the output word list that is received from the phrase selecting unit 13.

After the recreating unit 19 transmits the input word list to the document searching unit 14, the document searching unit 14, the pattern candidate creating unit 11, the phrase candidate creating unit 12, and the phrase selecting unit 13 execute the same processes as the third embodiment. However, the phrase selecting unit 13 transmits the output word list to the recreating unit 19. When the sufficient output word list is obtained, the recreating unit 19 outputs the output word list.

Next, an example of a process progress in this embodiment will be described. The input word list is input to the input device 100 from the user. The input device 100 transmits the input word list, which is input from the user, to the data processing device 200. That is, the data processing device 200 receives the input word list from the input device 100.

Then, the document searching unit 14, the pattern candidate creating unit 11, the phrase candidate creating unit 12, and the phrase selecting unit 13 execute the same processes as the third embodiment and create an output word list. The phrase selecting unit 13 transmits the created output word list to the recreating unit 19.

If receiving the output word list from the phrase selecting unit 13, the recreating unit 19 determines whether the sufficient output word list is accumulated or not. For example, if the total number of output words (however, overlapping output words are not counted), which are included in a copy of an output word list accumulated until now, is less than the predetermined number, the recreating unit 19 may determine that the sufficient output word list is not accumulated. In contrast, if the total number of output words, which are included in a copy of an output word list accumulated until now, is equal to or larger than the predetermined number, the recreating unit 19 may determine that the sufficient output word list is accumulated.

In addition, the recreating unit 19 may calculate a ratio (that is, an increasing rate of output words) of new output words (new output words that do not overlap the output words that are accumulated until now) included in a newly received output word list with respect to the total number of output words (however, overlapping output words are not counted) included in a copy of a previous output word list accumulated at a point of time when the output word list is received from the phrase selecting unit 13. In addition, if the increasing rate exceeds a predetermined value, the recreating unit 19 may determine that the sufficient output word list is not accumulated. In contrast, if the increasing rate is not more than the predetermined value, the recreating unit 19 may determine that the sufficient output word list is accumulated.

For example, if the number of times of when the recreating unit 19 transmits a set of output words included in the output word list as an input word list to the document searching unit 14 is not more than the predetermined number of times, the recreating unit 19 may determine that the sufficient output word list is not accumulated. In contrast, if the number of times reaches the predetermined number of times, the recreating unit 19 may determine that the sufficient output word list is accumulated.

Here, the three kinds of determination methods are described, but the determination methods are only exemplary, and the determination may be made using other determination methods. In addition, in each of the three kinds of determination methods, information of the value that is used as the threshold value may be previously held by the recreating unit 19. Alternatively, the information may be input to the recreating unit 19 from the user through the input device 100.

In particular, the determination is preferably performed using the determination method based on the increasing rate of the output words among the above-described three kinds of determination methods. The reason why an increasing rate of an output word that newly appears is low is because the output words can be recursively collected from the search result document group 18. In addition, in the determination method, it is preferable that the predetermined value that becomes the threshold value be approximately 10%. For example, when the increasing rate exceeds 10%, it is preferably determined that the sufficient output word list is not accumulated, and when the increasing rate is not more than 10%, it is preferably determined that the sufficient output word list is accumulated.

When it is determined that the sufficient output word list is not accumulated, the recreating unit 19 accumulates therein a copy of the output word list received from the phrase selecting unit 13. In addition, the recreating unit 19 transmits a set of output words included in the output word list received from the phrase selecting unit 13 as an input word list to the document searching unit 14. At this time, the recreating unit 19 deletes the search result document group 18, the pattern candidate 16, and the phrase candidate 17, which are stored in the storage device 400. If the recreating unit 19 transmits the list of output words as the input word list to the document searching unit 14, the document searching unit 14, the pattern candidate creating unit 11, the phrase candidate creating unit 12, and the phrase selecting unit 13 execute the same processes as the third embodiment and create the output word list. The phrase selecting unit 13 transmits the created output word list to the recreating unit 19, and the recreating unit 19 repeats the above-described operation.

In addition, when it is determined that the sufficient output word list is accumulated, the recreating unit 19 outputs the output word list, which is accumulated therein until now, to the output device 300. At this time, when there are overlapping phrases in the output word list accumulated in the recreating unit 19, the recreating unit 19 gathers the phrase scores to prevent the phrases from overlapping each other, and outputs the output word list to the output device 300. When gathering the phrase scores to prevent the phrases from overlapping each other, the recreating unit 19 may calculate an average value, a total value, a maximum value, or a minimum value of the phrase scores of the overlapping phrases to use the calculated value as the phrase score of the phrase, and may exclude the overlapping phrases and the phrase scores thereof from the output word list. In particular, it is preferable that a total value of the phrase scores of the overlapping phrases be determined as the phrase score of the phrases. The phrase that has become the output word many times is considered as a phrase that is to be included in a dictionary and has high reliability. If the total value of the phrase scores is used as the phrase score of the overlapping phrases, it is possible to increase the phrase score of the phrase that is considered as having high reliability.

The user of the information extraction system may create a dictionary that includes output words included in the output word list output from the output device 300 and input words input by the user. In addition, the user may refer to a phrase score corresponding to each output word to inspect whether or not to include the individual output words in the dictionary.

Next, an effect of the fourth embodiment will be described. In this embodiment, it is possible to increase the number of output words included in an output word list using a newly discovered phrase of the same kind as an input word list. Accordingly, it is possible to create a dictionary where phrases of the same kind are recursively collected. In addition, in the fourth embodiment, the pattern candidate creating unit 11, the phrase candidate creating unit 12, and the phrase selecting unit 13 may perform the same operation as the second embodiment (however, using the search result document group 18, not the document group 15). In this case, the same effect as the second embodiment can be obtained.

In addition, the fourth embodiment exemplifies the case where the recreating unit 19 transmits a set of output words included in the output word list as the input word list to the document searching unit 14. In the fourth embodiment, the data processing device 200 may be configured such that the data processing device does not include the document searching unit 14, and cannot create the search result document group 18. In this case, the recreating unit 19 transmits a set of output words included in the output word list as the input word list to the pattern candidate creating unit 11. Then, during the operation of the data processing device 200, the recreating unit 19 may process the document included in the document group 15 as a process subject.

Figure 14:
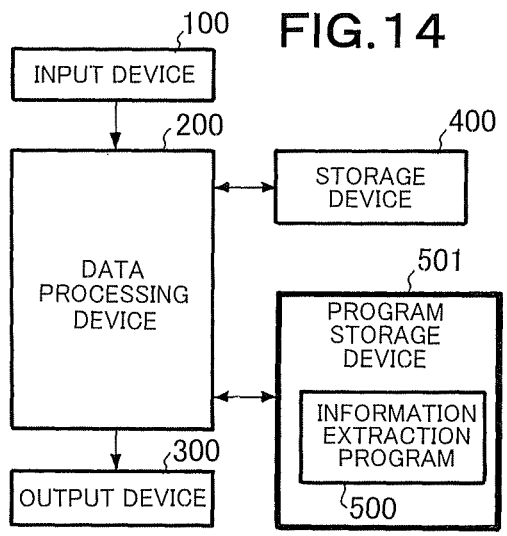
FIG. 14 is a block diagram showing an example of the specific configuration of an information extraction system.

In this case, a specific configuration example of each of the information extraction systems according to the first to fourth embodiments will be described. FIG. 14 is a block diagram showing a specific configuration example of each information extraction system according to each of the above-described embodiments. In the example that is shown in FIG. 14, the data processing device 200 is a computer that operates in accordance with a program. An input device 100, such as a keyboard or a mouse, and an output device 300, such as a display device or a printer, are connected to the data processing device 200. In addition, a storage device 400 is connected to the data processing device 200. The storage device 400 is a storage device that stores the document group 15, the pattern candidate 16, and the phrase candidate 17, and may be connected to the data processing device through a bus or a communication network. In the cases of the third and fourth embodiments, the storage device 400 also stores the search result document group 18. In addition, the data processing device 200 includes a program storage device 501 that stores an information extraction program 500. The data processing device 200 reads out an information extraction program 500 from the program storage device 501, and operates in accordance with the information extraction program 500. As a result, the data processing device 200 operates as the pattern candidate creating unit 11, the phrase candidate creating unit 12, the phrase selecting unit 13, and the phrase selecting unit 13. In addition, in the case of the third embodiment, the data processing device 200 also operates as the document searching unit 14. In the case of the fourth embodiment, the data processing device 200 also operates as the recreating unit 19. In addition, the data processing device 200 that is a computer may include a storage device installed therein and store information (for example, a copy of the output word list) in the storage device.

In addition, in each of the above-described embodiments, the data processing device 200 may include each of the units (the pattern candidate creating unit 11, the phrase candidate creating unit 12, the phrase selecting unit 13, the document searching unit 14, and the recreating unit 19) as an individual hardware device.

In addition, in each of the embodiments, the data processing device 200 may match output words included in the output word list with input words included in the input word list, thereby creating a dictionary. That is, the data processing device 200 may automatically create the dictionary.

Furthermore, in each of the embodiments, a keyboard or a mouse is exemplified as the input device 100, but the input word list may be input to the information extraction system from another device through the communication network. In this case, a communication interface with the communication network may be used as the input device 100. Also, an output aspect of the output word list may be an aspect where the output word list is output to another device through the communication network. Even in this case, a communication interface with the communication network may be used as the output device 300.

In addition, the input unit is realized by the input device 100. The patter determining unit is realized by the pattern candidate creating unit 11. The phrase candidate extracting unit is realized by the phrase candidate creating unit 12. The phrase selecting unit is realized by the phrase selecting unit 13. The document searching unit is realized by the document searching unit 14. The recreating unit is realized by the recreating unit 19.

Fifth Embodiment

Figure 15:
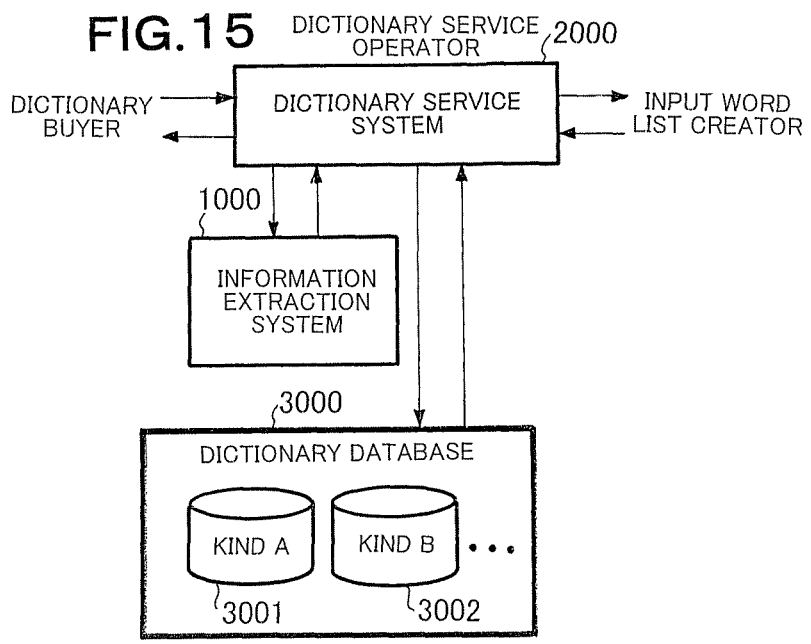
FIG. 15 is a block diagram showing a fifth embodiment of the present invention.

Next, a fifth embodiment of the present invention will be described. FIG. 15 is a block diagram showing a configuration example of an information service system according to the present invention. The information service system according to this embodiment includes an information extraction system 1000, a dictionary service system 2000, and a dictionary database 3000.

The information extraction system 1000 is the information extraction system according to any one of the first to fourth embodiments. However, in this embodiment, the input device 100 and the output device 300 (which are not shown in FIG. 15) are realized by the communication interface with the dictionary service system 2000. The input word list is input to the information extraction system 1000 from the dictionary service system 2000, and the information extraction system 1000 outputs a list of output words of the same kinds as the input words to the dictionary service system 2000.

The dictionary database 3000 is a storage device that stores various dictionaries 3001 and 3002. The various dictionaries 3001 and 3002 include output words that are output by the information extraction system 1000 and input words that are created by an input word list creator to extract the output words. In addition, each of the dictionaries is associated with information of the kind of each dictionary and is then registered.

The input word list is input to the dictionary service system 2000 from the input word list creator, and the dictionary service system 2000 uses the input word list to output an output word list to the information extraction system 1000. In addition, the dictionary service system 2000 provides the output word list to the input word list creator, thereby urging the input word list creator to create a dictionary including the input words and the output words. If receiving the dictionary from the input word list creator, the dictionary service system 2000 associates information of the kind of the dictionary and the dictionary with each other, and registers the dictionary and the information of the kind of the dictionary in the dictionary database 3000. In addition, the dictionary service system 2000 provides a dictionary, which is registered in the dictionary database 3000, to a dictionary buyer according to a request from the dictionary buyer. In addition, the dictionary service system 2000 records an amount of money that a dictionary service operator will receive from the dictionary buyer or an amount of money that is paid to the input word list creator.

In the description below, the description is made on the assumption that the dictionary service system 2000 exchanges information with a terminal of the dictionary buyer (hereinafter, referred to as buyer terminal) and a terminal of the input word list creator (hereinafter, referred to as creator terminal). The buyer terminal is a terminal that is operated by the dictionary buyer, and the creator terminal is a terminal that is operated by the input word list creator.

Figure 16:
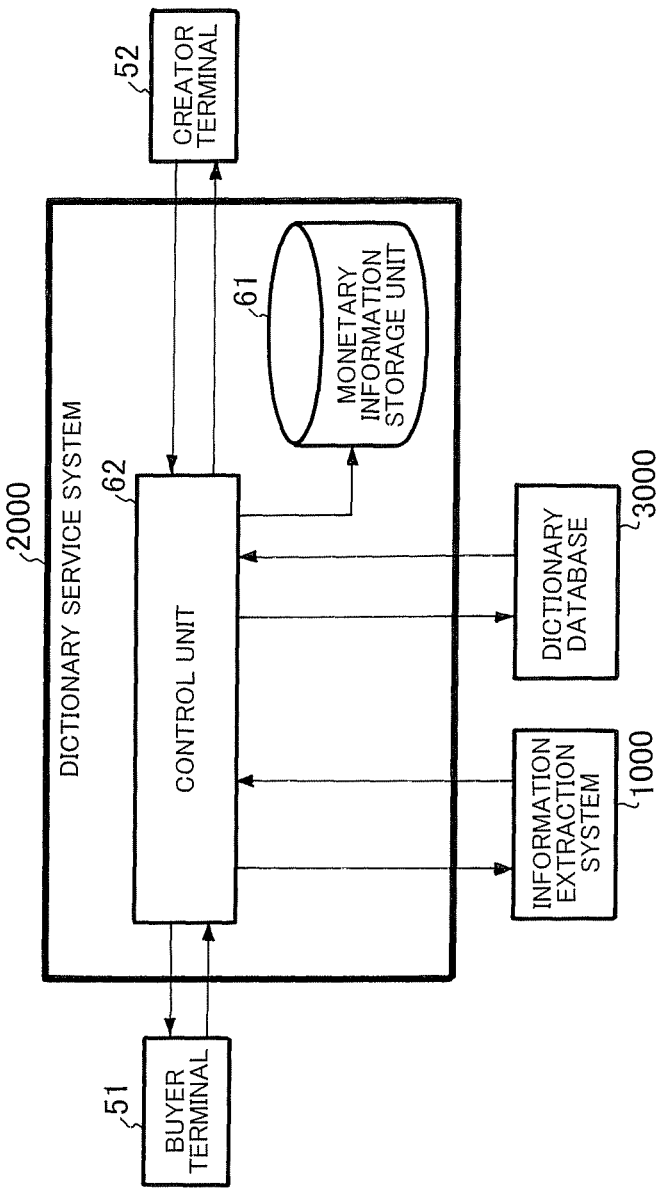
FIG. 16 is a block diagram showing an example of the configuration of a dictionary service system.

FIG. 16 is a block diagram showing a configuration example of the dictionary service system 2000. The dictionary service system 2000 includes a control unit 62 and a monetary information storage unit 61. The control unit 62 operates in accordance with a program that is stored in a storage device (not shown) included in the dictionary service system 2000. The control unit 62 exchanges information with the buyer terminal 51, the creator terminal 52, the information extraction system 1000, and the dictionary database 3000. The dictionary service system 2000 includes a communication interface that is used to transmit and receive information when performing communication with the buyer terminal 51, the creator terminal 52, and the information extraction system 1000, but the communication interface is not shown in FIG. 16. In addition, the dictionary service system 2000 includes an interface that is used to write information in the dictionary database 3000 or read out information from the dictionary database 3000, but the interface is not shown in FIG. 16. The control unit 62 exchanges information with another device through the communication interface (not shown) or reads or writes information through an interface (not shown) with the dictionary database 3000.

In addition, the monetary information storage unit 61 stores an amount of money that the dictionary service operator pays to the input word list creator or an amount of money that the dictionary service operator receives from the dictionary buyer. The control unit 62 stores the amount of money in the monetary information storage unit 61. The dictionary service operator serves as a manager that manages the dictionary service system 2000, the information extraction system 1000, and the dictionary database 3000.

Next, the operation will be described.

The buyer terminal 51 transmits a kind of a dictionary that the dictionary buyer desires to buy to the dictionary service system 2000, in accordance with the operation of the dictionary buyer. The control unit 62 of the dictionary service system 2000 receives information of the kind of the dictionary.

Subsequently, the control unit 62 searches the dictionary database 3000 and determines whether or not the dictionary of the kind that the dictionary buyer desires to buy is registered in the dictionary database 3000.

When it is determined that the dictionary of the kind that the dictionary buyer desires to buy is not registered in the dictionary database 3000, the control unit 62 operates as follows. The control unit 62 transmits the kind of the dictionary that the dictionary buyer desires to buy to the creator terminal 52, thereby presenting the kind of the dictionary that the dictionary buyer desires to buy to the input word list creator.

The input word list creator creates an input word list according to the kind of the dictionary, and transmits the input word list to the dictionary service system 2000. At this time, the input word list that is created by the input word list creator is input to the creator terminal 52, and the creator terminal 52 transmits the input word list to the dictionary service system 2000 in accordance with the operation of the input word list creator. The control unit 62 of the dictionary service system 2000 receives the input word list.

If receiving the input word list, the control unit 62 stores information of an amount of money (value of dictionary creation) that the dictionary service operator will pay to the input word list creator who has created the input word list in the monetary information storage unit 61. At this time, the control unit 62 associates the information of the amount of money and identification information of the input word list creator with each other and stores the information of the amount of money and the identification information in the monetary information storage unit 61. For example, when the creator terminal 52 transmits the input word list, the creator terminal 52 also transmits the identification information of the input word list creator to the control unit 62 in accordance with the operation of the input word list creator. As a result, the control unit 62 can obtain the identification information of the input word list creator.

Further, the control unit 62 outputs the input word list, which is received from the creator terminal 52, to the information extraction system 1000. The information extraction system 1000 uses the input word list input from the control unit 62 to create an output word list. The information extraction system 1000 may create the output word list by the operation, which has been described in any one of the first to fourth embodiments. The information extraction system 1000 outputs the output word list to the dictionary service system 2000, and the control unit 62 obtains the output word list.

The control unit 62 transmits the output word list to the creator terminal 52, thereby urging the input word list creator to create the dictionary. The input word list creator creates a dictionary that includes input words included in the input word list created by the input word list creator and output words included in the output word list received from the control unit 62. At this time, the input word list creator may inspect the output word list to create the dictionary (for example, may create the dictionary while excluding the unnecessary output words). The created dictionary is input to the creator terminal 52, and the creator terminal 52 transmits the dictionary to the dictionary service system 2000, in accordance with the operation of the input word list creator. If receiving the dictionary, the control unit 62 associates the kind of the dictionary that the dictionary buyer desires to buy and the dictionary with each other and registers the kind of the dictionary and the dictionary in the database 3000.

Next, the control unit 62 reads out the dictionary of the kind that the dictionary buyer desires to buy from the dictionary database 3000 and transmits the dictionary to the buyer terminal 51, thereby providing the dictionary to the dictionary buyer.

When it is determined that the dictionary of the kind that the dictionary buyer desires to buy is registered in the dictionary database 3000, the control unit 62 may read out the dictionary from the dictionary database 3000 and transmits the dictionary to the buyer terminal 51, thereby providing the dictionary to the dictionary buyer.

When reading out the dictionary from the dictionary database 3000 and transmitting the dictionary to the buyer terminal 51, the control unit 62 stores identification information of the dictionary buyer and information of an amount of money that the dictionary service operator receives as a value of the dictionary from the dictionary buyer in the monetary information storage unit 61. For example, when the buyer terminal 51 transmits the kind of the dictionary, the buyer terminal 51 also transmits the identification information of the dictionary buyer to the control unit 62, in accordance with the operation of the dictionary buyer. As a result, the control unit 62 can obtain the identification information of the dictionary buyer.

The dictionary service operator confirms the identification information of the dictionary buyer and the amount of money that are stored in the monetary information storage unit 61 and charges the dictionary buyer for a value of the dictionary. The dictionary buyer pays the value of the dictionary to the dictionary service operator. In addition, the dictionary service operator confirms the identification information of the input word list creator and the amount of money that are stored in the monetary information storage unit 61 and pays the amount of money to the input word list creator.

In this case, the input word list creator and the dictionary buyer may be the same person. In this case, the dictionary buyer does not need to pay the value of the dictionary to the input word list creator.

According to the fifth embodiment, the dictionary can be provided at a low price, as compared with the previous embodiments. The reason why the dictionary can be provided at a low price is because the dictionary can be automatically created by the information extraction system. In the past, in order to create and sell the dictionary, people need to collect a large amount of documents and rearrange the collected documents, which causes a high cost. However, if the information extraction system is used, the dictionary can be automatically created. Therefore, the dictionary can be provided at a low price, as compared with the related art.

In addition, the dictionary service operator may create the input word list. However, in this case, the dictionary service operator needs a lot of knowledge about the kinds of the required dictionaries. In this embodiment, it is possible to create various kinds of dictionaries by recruiting input word list creators widely and paying values to the input word list creators.

Sixth Embodiment

Next, a sixth embodiment of the present invention will be described. The configuration of an information service system according to this embodiment is almost the same as the configuration of the fifth embodiment (refer to FIGS. 15 and 16). However, the sixth embodiment is different from the fifth embodiment in an aspect of paying a value of dictionary creation to the input word list creator. In this embodiment, when the dictionary is sold (provided) to the dictionary buyer, an amount of money that the dictionary service operator will pay as a value of dictionary creation is stored in the monetary information storage unit 61. That is, if the dictionary is sold, the value of dictionary creation is paid to the input word list creator. In addition, when creation charges are paid to the input word list creator, the creation charges are subtracted by a value as the dictionary service system utilization rate.

Even in the description below, the description is made on the assumption that the dictionary service system 2000 exchanges information with a terminal of a dictionary buyer (buyer terminal) and a terminal of an input word list creator (creator terminal).

The operation according to this embodiment will be described.

First, the input word creator creates the input word list, and uses the creator terminal 52 to transmit the input word list to the dictionary service system 2000. At this time, the input word list is input to the creator terminal 52, and the creator terminal 52 transmits the input word list to the dictionary service system 2000, in accordance with the operation of the input word creator. The control unit 62 of the dictionary service system 2000 receives the input word list.

The control unit 62 outputs the input word list, which is received from the creator terminal 52, to the information extraction system 1000. The information extraction system 1000 uses the input word list input from the control unit 62 to create an output word list. The information extraction system 1000 may create the output word list by the operation, which has been described in any one of the first to fourth embodiments. The information extraction system 1000 outputs the output word list to the dictionary service system 2000, and the control unit 62 obtains the output word list.

The control unit 62 transmits the output word list to the creator terminal 52, thereby urging the input word list creator to create the dictionary. The input word list creator creates a dictionary that includes input words included in the input word list created by the input word list creator and output words included in the output word list received from the control unit 62. At this time, the input word list creator may inspect the output word list and create the dictionary (for example, may create the dictionary while excluding the unnecessary output words). The input word list creator transmits the created dictionary and the kind of the created dictionary from the creator terminal 52 to the dictionary service system 2000. That is, the creator terminal 52 receives the created dictionary and the kind of the created dictionary, and transmits the dictionary and the kind of the dictionary to the dictionary service system 2000, in accordance with the operation of the input word list creator.

If receiving the dictionary and the kind of the dictionary from the creator terminal 52, the control unit 62 of the dictionary service system 2000 associates the dictionary and the kind of the dictionary with each other and registers the association result in the dictionary database 3000.

Next, the dictionary buyer refers to the dictionary database 3000 through the dictionary service system 2000 to buy the dictionary of the kind that the dictionary buyer desires to buy. At this time, the buyer terminal 51 transmits information indicating that the dictionary buyer desires to buy the dictionary to the control unit 62, in accordance with the operation of the dictionary buyer. If receiving the information, the control unit 62 reads out the kind of each dictionary that is registered in the dictionary database 3000 and transmits information of the kind of each dictionary to the buyer terminal 51, thereby urging the dictionary buyer to select the kind of a desired dictionary. The buyer terminal 51 transmits the kind of the dictionary that the dictionary buyer desires to buy to the control unit 62, in accordance with the operation of the dictionary buyer. If receiving the information of the kind of the dictionary from the buyer terminal 51, the control unit 62 reads out the dictionary corresponding to the kind from the dictionary database 3000 and transmits the corresponding dictionary to the buyer terminal 51. As a result, the dictionary is provided to the dictionary buyer. In addition, the control unit 62 associates an amount of money corresponding to the value of the dictionary and the identification information of the dictionary buyer with each other and stores the association result in the monetary information storage unit 61. For example, the buyer terminal 51 may transmit the identification information of the dictionary buyer, thereby notifying the control unit 62 of the identification information of the dictionary buyer.

In addition, when the dictionary is provided to the dictionary buyer (when the dictionary is transmitted to the buyer terminal 51), the control unit 62 associates an amount of money as a value of dictionary creation that the dictionary service operator will pay to the input word list creator and identification information of the input word list creator with each other, and stores the association result in the monetary information storage unit 61. For example, when transmitting the dictionary, the creator terminal 52 may also transmit the identification information of the input word list creator, thereby notifying the control unit 62 of the identification information of the input word list creator.

The dictionary service operator confirms the amount of money and the identification information of the dictionary buyer, which are stored in the monetary information storage unit 61, and charges the dictionary buyer for the value of the dictionary. The dictionary buyer pays the value of the dictionary to the dictionary service operator.

In addition, the dictionary service operator confirms the amount of money and the identification information of the input word list creator, which are stored in the monetary information storage unit 61, and pays the amount of money to the input word list creator. At this time, the dictionary service operator pays an amount, which is obtained by subtracting the amount of money by the dictionary service system utilization rate, to the input word list creator. The control unit 62 may store an amount, which is obtained by subtracting the value of dictionary creation by the dictionary service system utilization rate, in the monetary information storage unit 61.

In addition, the input word list creator and the dictionary buyer may be the same person. In this case, the dictionary buyer does not need to pay the value of the dictionary creation to the input word list creator. The dictionary buyer may pay the dictionary service system utilization rate to the dictionary service operator. In this case, the control unit 62 may store the dictionary service system utilization rate instead of the value of providing the dictionary in the monetary information storage unit 61.

In this embodiment, it is possible to easily secure reliability of the dictionary while suppressing a cost. In the dictionary creation according to the related art, since people collect phrases becoming dictionary items from a large amount of documents, reliability of the dictionary is high, but a high cost is caused. However, if the information extraction system is used, since phrases that constitutes candidates of the dictionary items can be automatically output as the output word list, it is possible to suppress costs required when creating the dictionary. In addition, it is possible to maintain reliability of the dictionary by inspecting the output word list.

In addition, the registering unit, the dictionary providing unit, and the monetary information registering unit are realized by the control unit 62 of the dictionary service system 2000. The monetary information storage unit is realized by the monetary information storage unit 61 of the dictionary service system 2000.

Seventh Embodiment

Figure 17:
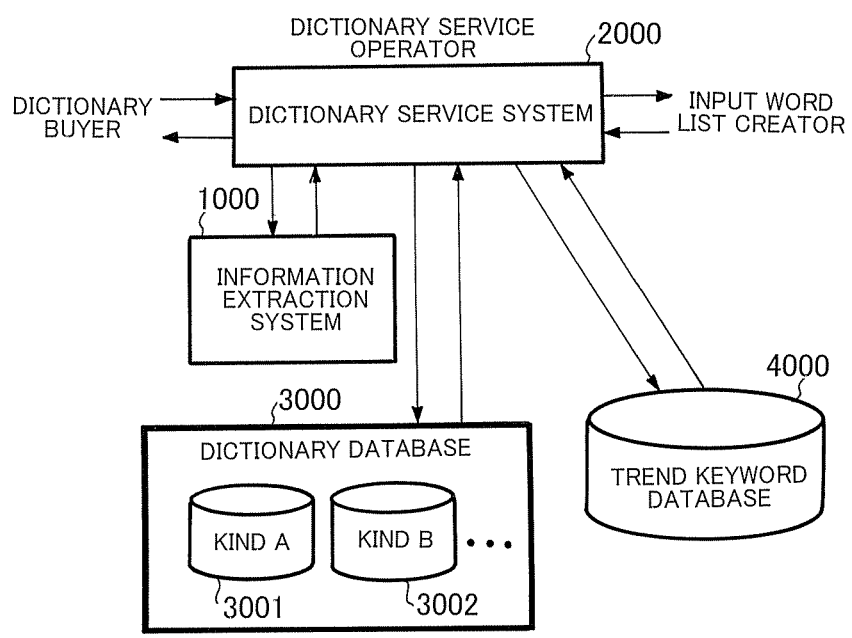
FIG. 17 is a block diagram showing a seventh embodiment of the present invention.

Next, a seventh embodiment of the present invention will be described. FIG. 17 is a block diagram showing a configuration example of an information service system according to this embodiment. The same constituent elements as those of the sixth embodiment are denoted by the same reference numerals as those in FIG. 15, and the repetitive description is omitted. The information service system according to this embodiment includes a trend keyword database 4000. In addition, the dictionary service system 2000 includes a control unit 62 and a monetary information storage unit 61 (refer to FIG. 16), in the same method as the sixth embodiment.

The trend keyword database 4000 is a storage device that stores a list of keywords becoming trendy. In this embodiment, the control unit 62 (not shown in FIG. 17, refer to FIG. 16) of the dictionary service system 2000 performs a read/write operation of information with respect to the trend keyword database 4000, in the same method as the read/write operation on the dictionary database 3000.

The control unit 62 creates the list of keywords becoming trendy and stores the list of keywords in the trend keyword database 4000. The control unit 62 may access the search keyword log of a search engine that is generally used on the Internet, extract words that are frequently searched as keywords, and store the list of keywords in the trend keyword database 4000. There are Web pages where words that are searched by the search engine are ranked in order with a large number of times of search and displayed. The control unit 62 may acquire display data of such Web pages and extract keywords ranked in the high rank of the search number of times in the Web pages. For example, as URL of such Web pages, there are "http://guide.search.goo.ne.jp/ranking/", "http://picks.dir.yahoo.co.jp/new/review2005/index.html", http://search.biglobe.ne.jp/ranking.html, and the like. In addition, the control unit 62 may acquire display data of Web pages providing news articles and acquire words appearing in the Web pages as keywords. In addition, the list of keywords may be manually created, input to the dictionary service system 2000, and stored in the trend keyword database.

Next, the operation will be described.

First, the input word list creator refers to the trend keyword database 4000 through the dictionary service system 2000. For example, the creator terminal 52 (not shown in FIG. 17, refer to FIG. 16) requests the dictionary service system 2000 to transmit a list of keywords stored in the trend keyword database 4000, in accordance with the operation of the input word list creator. In accordance with the request, the control unit 62 of the dictionary service system 2000 reads out the list of keywords stored in the trend keyword database 4000 and transmits the list of keywords to the creator terminal 52. The creator terminal displays the received list of keywords, thereby presenting the list of keywords to the input word list creator.

Since the list of keywords is a list of phrases becoming trendy, it is possible to determine a kind of a dictionary where the possibility of being sold is high, on the basis of the list of keywords. The input word list creator refers to the list of keywords to determine the kind of the dictionary, and creates a list of input words to be included in the dictionary. As such, the input word list creator creates an input word list according to the dictionary of the kind where the possibility of being sold is high.

The following operation is the same as the operation of the sixth embodiment. If the following operation is performed, the dictionary where the possibility of being sold is high (that is, dictionary where the possibility of selling is high) can be registered in the dictionary database 3000.

In this embodiment, if the input word list creator refers to the keywords stored in the trend keyword database 4000, it is possible to determine which kinds of phrases are included in a dictionary that sells well. Accordingly, the input word list creator can easily determine the kind of the dictionary where the possibility of being sold is high. If the input word list creator creates an input word list to create a dictionary that sells well, the information extraction system uses the created list of input words to quickly create a list of output words. Accordingly, the input word list creator can quickly create the dictionary where the possibility of being sold is high. In addition, since the created dictionary is considered as a dictionary where the possibility of being sold is high, the number of dictionaries to be sold increases. As a result, incomes of the input word list creator and the dictionary service operator increase.

The trend keyword storage unit is realized by the trend keyword database 4000. The trend keyword providing unit is realized by the control unit 62 of the dictionary service system 2000.

Eighth Embodiment

Figure 18:
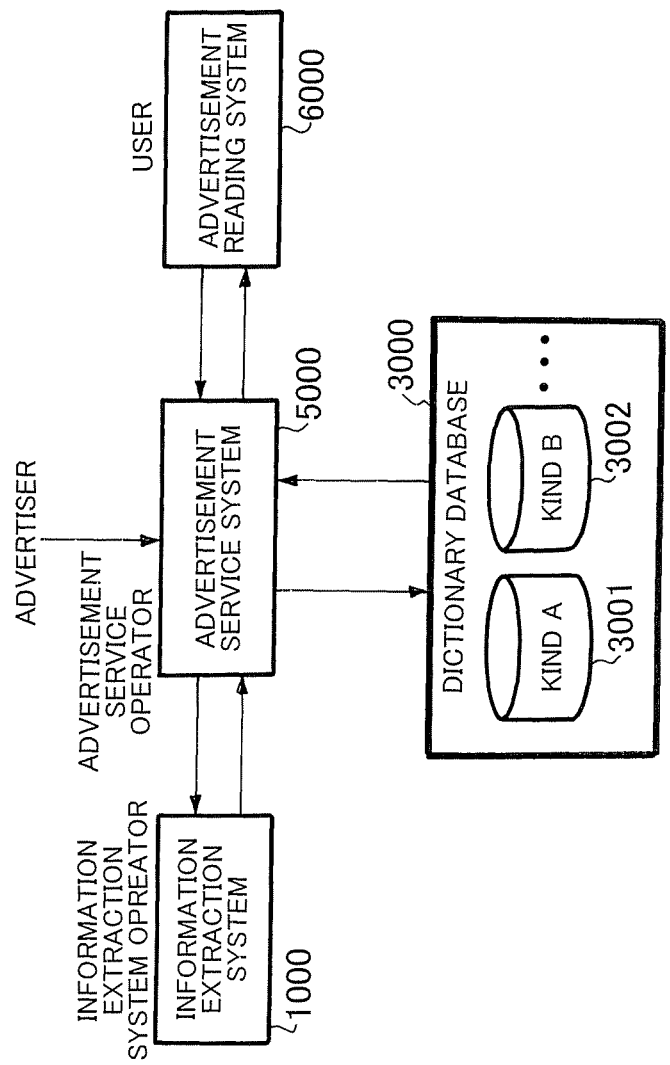
FIG. 18 is a block diagram showing an eighth embodiment of the present invention.

Next, an eighth embodiment of the present invention will be described. FIG. 18 is a block diagram showing a configuration example of an information service system according to an eighth embodiment. The information service system according to this embodiment includes an information extraction system 1000, an advertisement service system 5000, and a dictionary database 3000. In addition, an advertisement reading system 6000 is connected to the advertisement service system 5000 through a communication network.

The information extraction system 1000 is the information extraction system according to any one of the first to fourth embodiments. However, in this embodiment, the input device 100 and the output device 300 (which are not shown in FIG. 18) are realized by a communication interface with the advertisement service system 5000. The input word list is input from the advertisement service system 5000 to the information extraction system 1000, and the information extraction system 1000 outputs a list of output words of the same kind as the input words to the advertisement service system 5000. The information extraction system 1000 is operated by the information extraction system operator.

The advertisement service system 5000 receives an advertisement and a keyword related to the advertisement from an advertiser, associates the advertisement and the related keyword with each other, and stores the association result in a storage device that is included in the advertisement service system 5000. In addition, the advertisement service system 5000 receives a keyword from the advertisement reading system 6000 and returns an advertisement that is related to the keyword. At this time, when a dictionary that includes the keyword is discovered as the result of referring to the dictionary database 3000, the advertisement service system 5000 acquires the keyword (phrase) from the dictionary, and returns the advertisement corresponding to the acquired keyword to the advertisement reading system. In this way, the advertisement service system 5000 delivers the advertisement to the advertisement reading system 6000. The advertisement service system 5000 is operated by the advertisement service operator.

The dictionary database 3000 is a storage device that stores various dictionaries 3001 and 3002. The various dictionaries 3001 and 3002 include output words that are output by the information extraction system 1000 and input words that are created by the advertisement service operator to extract the output words. Each of the dictionaries is associated with the kind of each of the dictionaries and is then stored.

The advertisement reading system 6000 receives a keyword or a document from an advertisement reader. When receiving the document, the advertisement reading system 6000 uses a general morphological analysis tool to divide character strings in the document into words, and determines the divided words as keywords. In addition, the advertisement reading system 6000 transmits the keyword to the advertisement service system 5000, receives the advertisement corresponding to the keyword, and displays the advertisement. When displaying the advertisement, the advertisement reading system 6000 uses a general document reading tool or a Web browser.

In the description below, the description is made on the assumption that the advertisement service system 5000 exchanges information with a terminal of an advertiser (hereinafter, referred to as advertiser terminal) and a terminal of an advertisement service operator (hereinafter, referred to as operator terminal). The advertiser terminal is a terminal that is operated by the advertiser, and the operator terminal is a terminal that is operated by the advertisement service operator.

Figure 19:
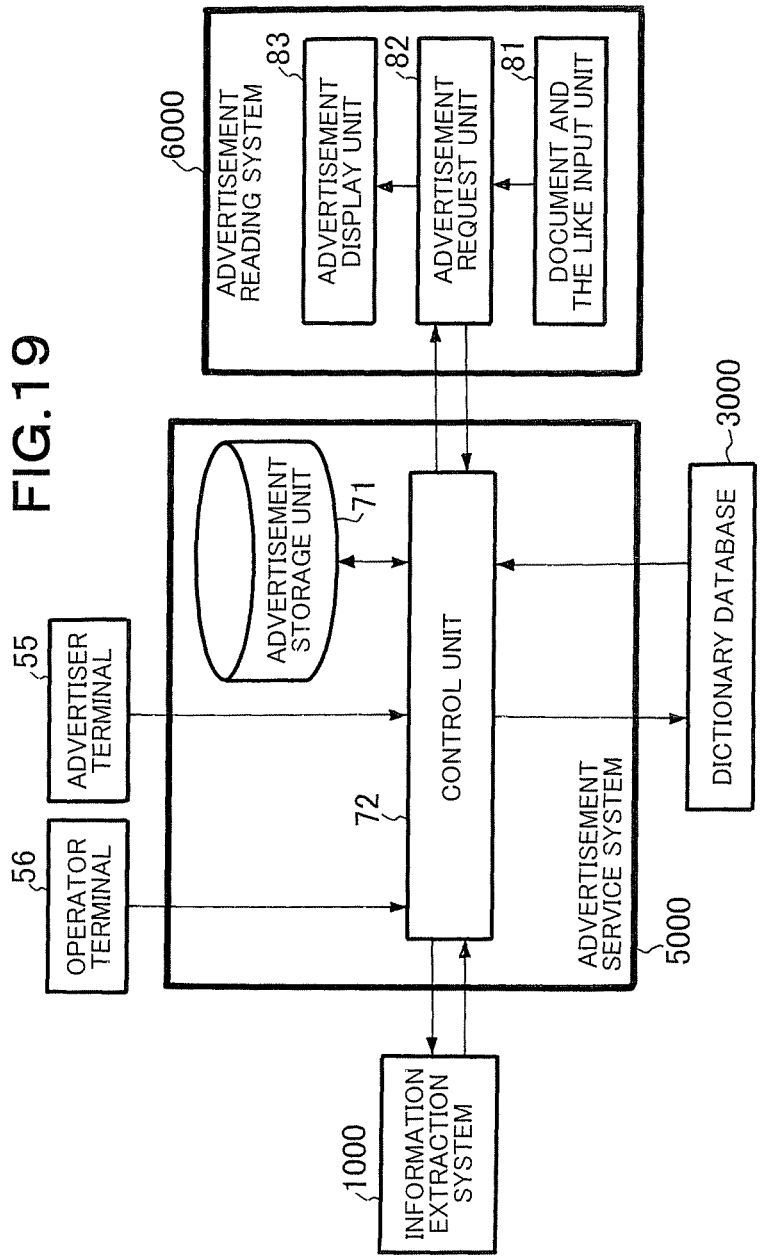
FIG. 19 is a block diagram showing an example of the configuration of an advertisement service system and an advertisement reading system.

FIG. 19 is a block diagram showing a configuration example of the advertisement service system 5000 and the advertisement reading system 6000. The advertisement service system 5000 includes a control unit 72 and an advertisement storage unit 71. The control unit 72 operates in accordance with a program that is stored in a storage device (not shown) included in the advertisement service system 5000. The control unit 62 exchanges information with the advertiser terminal 55, the operator terminal 56, the information extraction system 1000, and the dictionary database 3000. The advertisement service system 5000 includes a communication interface that is used to transmit and receive information, when performing communication with the advertiser terminal 55, the operator terminal 56, and the information extraction system 1000, but the communication interface is not shown in FIG. 19. In addition, the advertisement service system 5000 includes an interface that is used to write information in the dictionary database 3000 or read out information from the dictionary database 3000, but the interface is not shown in FIG. 19. The control unit 72 exchanges information with another device through a communication interface (not shown) or reads/writes information through an interface (not shown) with the dictionary database 3000.

In addition, the advertisement storage unit 71 associates an advertisement and a keyword related to the advertisement with each other and stores the advertisement and the related keyword. The control unit 72 receives an advertisement and a related keyword from the advertiser terminal 55, associates the advertisement and the related keyword with each other, and stores the association result in the advertisement storage unit 71.

The advertisement reading system 6000 includes a document and the like input unit 81, an advertisement request unit 82, and an advertisement display unit 83. The document and the like input unit 81 is an input device, such as a keyboard, through which a keyword or a document is input. The advertisement display unit 83 is a display device that displays an advertisement.

The advertisement request unit 82 operates in accordance with programs (various programs, such as a morphological analysis program or a browser). The advertisement request unit 82 transmits the keyword that is input to the document and the like input unit 81 to the advertisement service system 5000 so as to request for an advertisement that is related to the keyword. In addition, when a document is input to the document and the like input unit 81, the advertisement request unit 82 performs a morphological analysis with respect to a character string in the document to divide the character string into words, and determines the words as keywords. If receiving an advertisement from the advertisement service system 5000, the advertisement request unit 82 displays the advertisement on the advertisement display unit 83.

Next, the operation will be described. The operation according to this embodiment is divided into the following three phases. The first phase is a phase in which the advertisement service system 5000 receives an advertisement from the advertiser (advertiser terminal 55) and registers the advertisement in the advertisement storage unit 71. The second phase is a phase in which the advertisement service system 5000 makes the information extraction system 1000 create the output word list and registers the dictionary in the dictionary database. The third phase is a phase in which the advertisement reading system 6000 receives an advertisement from the advertisement service system 5000 and displays the advertisement. The first and second phases are asynchronously executed and the third phase is then executed.

The first phase will be described. The advertiser terminal 55 transmits an advertisement input from the advertiser and a keyword related to the advertisement to the advertisement service system 5000, in accordance with the operation of the advertiser. The control unit 72 of the advertisement service system 5000 receives the advertisement and the related keyword from the advertiser terminal 55.

In this case, the advertisement, which is an advertising material of a product or a service that the advertiser desires to buy, includes a natural sentence character string or an image. The related keyword is a phrase that is related to a product or a service that the advertiser desires to buy. The related keyword corresponds to a phrase that shows a product name or a service name and a characteristic of the product. In particular, in this embodiment, it is preferable that the related keyword include a product name or a service name. This is because the product name or the service name is a proper phrase of the product and shows a characteristic of the product most accurately. For example, when the advertisement is an advertisement of a product about a security, the "security product X", the "information leakage", and the "security" may be determined as the related keywords.

If receiving the advertisement and the related keywords, the control unit 72 associates the advertisement and the related keyword list with each other and stores the association result in the advertisement storage unit 71. The description until now corresponds to the operation of the first phase.

The second phase will be described. First, the advertisement service operator creates an input word list. When creating the input word list, the advertisement service operator may refer to the related keyword list of the advertisement that is stored in the advertisement storage unit 71 of the advertisement service system 5000. In addition, the advertisement service operator may refer to the related keyword list to create an input word list on the basis of product names or service names having a lot of kinds. For example, when there are a lot of related keywords about security-related products, the advertisement service operator may create an input word list that uses the product names "security product X", "security product Y", and "security product Z" as input words.

The operator terminal 56 receives the created input word list and the kind thereof, and transmits the input word list and information of the kind thereof to the advertisement service system 5000, in accordance with the operation of the advertisement service operator. If receiving the input word list and the information of the kind thereof from the operator terminal 56, the control unit 72 of the advertisement service system 5000 transmits the input word list and the information of the kind thereof to the information extraction system 1000. For example, the control unit 72 receives an input word list that is composed of input words, such as the "security product X", the "security product Y", and the "security product Z", and the kind (in this example, "security") of the input word list from the operator terminal 56, and transmits the input word list and the kind thereof to the information extraction system 1000.

If receiving the input word list from the control unit 72, the information extraction system 1000 uses the input word list to create an output word list. The information extraction system 1000 may create the output word list by the operation that has been described in any one of the first to fourth embodiments. As a result, for example, a list of security-related product names is created as the output word list. The information extraction system 1000 outputs the output word list to the advertisement service system 5000, and the control unit 72 obtains the output word list.

The control unit 72 of the advertisement service system 5000 creates a dictionary, including output words included in the output word list and input words included in the input word list. Then, the control unit 72 stores the dictionary and a name of the kind of the dictionary in the dictionary database 3000. The description until now corresponds to the operation of the second phase.

The third phase will be described. First, the keyword list or the document is input to the document and the like input unit 81 of the advertisement reading system 6000 from the advertisement reader. The keyword is the phrase in which the advertisement reader is interested, like a keyword input to the search engine, which is generally used on the Internet. The document that is input to the document and the like input unit 81 is a document where a format is determined to some extent, such as the natural sentence text or HTML document.

Only when a document is input, the advertisement request unit 82 uses a general morphological analysis tool to divide the document into words, and determines the words as a keyword list. The advertisement request unit 82 transmits the keyword list created in the above-described way or the keywords, which are directly input from the advertisement reader, to the advertisement service system 5000. For example, the advertisement request unit 82 transmits the keyword, such as the "security product Y", to the advertisement service system 5000.

The control unit 72 of the advertisement service system 5000 refers to the dictionary database 3000 to determine whether the phrase of the keyword list received from the advertisement request unit 82 is included in each dictionary. When it is determined that the phrase of the keyword list is included in the dictionary, the control unit 72 reads out a phrase group (that is, phrase group of the same kind as the phrases of the keyword list) included in the dictionary from the dictionary database 3000. For example, when the phrase like the "security product Y" is included in the dictionary of the kind like the "security", the control unit 72 obtains phrases, such as the "security product X" and the "security product Z", which are included in the dictionary of the "security".

Next, the control unit 72 refers to the advertisement and the related keyword list stored in the advertisement storage unit 71 to read out the keyword list, which is received from the advertisement reading system 6000, and an advertisement, which corresponds to each of the phrases obtained from the dictionary database 3000, from the advertisement storage unit 71. For example, the control unit 72 reads out an advertisement of the "security product X" that is stored in the first phase.

Next, the control unit 72 transmits the advertisement, which is read out from the advertisement storage unit 71, to the advertisement reading system 6000. If receiving the advertisement, the advertisement request unit 82 of the advertisement reading system 6000 displays the received advertisement on the advertisement display unit 82. The description until now corresponds to the operation of the third phase.

According to this embodiment, the related advertisement can be widely displayed, as compared with the previous embodiments. As a result, it is possible to achieve an effect in which the advertisement reader can have wide selectivity and the advertiser can have the large number of times of advertisement display. The reason is because a dictionary of related products can be simply created using the information extraction system 1000 and advertisements that are read by referring to the dictionary can be widely collected.

That is, not only the advertisement related to the keyword received from the advertisement reading system 6000 but also the phrase group of the same kind as the keyword can be read out from the dictionary, and the advertisement related to the keyword received from the advertisement reading system 6000 and the advertisement related to the phrase read out from the dictionary can be obtained from the advertisement storage unit 71 and provided to the advertisement reading system. For example, when the keyword like the "security product Y" is received from the advertisement reading system, if the advertisement of the "security product Y" is provided and the dictionary that includes the "security product Y" and the "security product X" as the phrases of the same kind is registered in the dictionary database 3000, an advertisement of the related product "security product X" can also be provided. As a result, it is possible to increase an advertisement opportunity of the advertiser.

In addition, even though the product frequently changes, the information extraction system 1000 can automatically create the output word list, and thus it is possible to quickly and simply create the dictionary.

The registering unit and the advertisement providing unit are realized by the control unit 72 of the advertisement service system 5000. The advertisement storage unit is realized by the advertisement storage unit 71 of the advertisement service system 5000.

INDUSTRIAL APPLICABILITY

According to the present invention, the characteristic of the present invention can be applied to the case of dictionary creation where a list of phrases of people's names or a list of phrases of names of places is simply created. Further, the characteristic of the present invention can be applied to the case of information extraction where phrases of specific kinds are searched and extracted from the document.

The invention claimed is:

1. An information extraction system that extracts phrases in documents from the documents and outputs the extracted phrases, comprising:
   a processing device with an input unit that receives an input word list including a plurality of phrases;
   a storage unit that stores a plurality of documents including documents having formats different from each other;
   a pattern determining unit, of the processing device, that selects one document from the plurality of documents stored in the storage unit, finds a pattern, which separates a phrase included in the input word list from other words in the selected document, as a pattern, for each of the documents, and stores in the storage unit the found pattern associated with the selected document;
   a phrase candidate extracting unit, of the processing device, that extracts a character string separated by a pattern stored in the storage unit from a document associated with the pattern and determines the character string as a phrase candidate; and
   a phrase selecting unit, of the processing device, that, among phrase candidates extracted by the phrase candidate extracting unit or partial character strings included in the phrase candidates, selects as a target phrase to be outputted a phrase candidate or a partial character string that satisfies a predetermined condition,
   wherein the pattern determining unit finds the pattern by i) obtaining character strings each consisting of a predetermined number of characters located at least at one of immediately before and after the phrases included in the input word list, and ii) extracting, as the pattern, portions common to at least two of the character strings from the obtained character strings.

2. The information extraction system according to claim 1, wherein the pattern determining unit determines a forward character string and a backward character string of the phrase included in the input word list as patterns,
   the phrase candidate extracting unit extracts a character string interposed between the forward character string and the backward character string from the document and determines the extracted character string as a candidate of a phrase, and
   the phrase selecting unit selects a phrase of an output subject from the candidates of the phrases, which are extracted by the phrase candidate extracting unit.

3. The information extraction system according to claim 2, wherein the phrase selecting unit calculates a phrase score indicating a value of a degree of importance of a candidate of the pattern used in specifying the candidate of the phrase or the amount of documents where the candidate of the phrase appears for each of the candidates of the phrases, and selects the candidate of the phrase having a phrase score is equal to or larger than a predetermined threshold value as the phrase of the output subject.

4. The information extraction system according to claim 2, wherein the phrase selecting unit calculates a phrase score indicating a value of a degree of importance of a candidate of the pattern used in specifying the candidate of the phrase or the amount of documents where the candidate of the phrase appears for each of the candidates of the phrases, sorts the candidates of the phrases in the order of high phrase scores, and selects the candidate of the phrase at a predetermined rank or more as the phrase of the output subject.

5. The information extraction system according to claim 2, wherein the phrase selecting unit calculates a phrase score indicating a value of a degree of importance of a candidate of the pattern used in specifying the candidate of the phrase or the amount of documents where the candidate of the phrase appears for each of the candidates of the phrases, sorts the candidates of the phrases in the order of high phrase scores, and selects the candidate of the phrase at high ranks of a predetermined ratio as the phrase of the output subject.

6. The information extraction system according to claim 1, wherein the pattern determining unit determines only a forward character string of the phrase included in the input word list or a backward character string of the phrase included in the input word list as a pattern,
the phrase candidate extracting unit extracts a character string subsequent to the forward character string or a character string immediately before the backward character string from the document and determines the extracted character string as the candidate of the phrase, and
the phrase selecting unit creates partial character strings included in the candidate of the phrase, and selects a phrase of the output subject from the created partial character strings.

7. The information extraction system according to claim 6, wherein the phrase selecting unit calculates a ratio of the number of the candidates of the phrases including the partial character strings with respect to a total number of the candidates of the phrases for each of the candidates of the phrases and each of the partial character strings, specifies the partial character strings where the ratio is within a predetermined ratio, calculates a phrase score indicating a value of a degree of importance of the candidate of the pattern used in specifying the candidate of the phrase or the amount of documents where the candidate of the phrase appears for each of the candidates of the phrases including the specified partial character strings to determine the calculation result as the phrase score of the partial character string, and selects the partial character string where a phrase score is equal to or larger than a predetermined threshold value as the phrase of the output subject.

8. The information extraction system according to claim 6, wherein the phrase selecting unit calculates a ratio of the number of the candidates of the phrases including the partial character strings with respect to a total number of the candidates of the phrases for each of the candidates of the phrases and each of the partial character strings, specifies the partial character strings where the ratio is within a predetermined ratio, calculates a phrase score indicating a value of a degree of importance of the candidate of the pattern used in specifying the candidate of the phrase or the amount of documents where the candidate of the phrase appears for each of the candidates of the phrases including the specified partial character strings to determine the calculation result as the phrase score of the partial character string, sorts the partial character strings in the order of high phrase scores, and selects the partial character string at a predetermined rank or more as the phrase of the output subject.

9. The information extraction system according to claim 6, wherein the phrase selecting unit calculates a ratio of the number of the candidates of the phrases including the partial character strings with respect to a total number of the candidates of the phrases for each of the candidates of the phrases and each of the partial character strings, specifies the partial character strings where the ratio is within a predetermined ratio, calculates a phrase score indicating a value of a degree of importance of the candidate of the pattern used in specifying the candidate of the phrase or the amount of documents where the candidate of the phrase appears for each of the candidates of the phrases including the specified partial character strings to determine the calculation result as the phrase score of the partial character string, sorts the partial character strings in the order of high phrase scores, and selects the partial character string at high ranks of a predetermined ratio as the phrase of the output subject.

10. The information extraction system according to claim 1, further comprising:
a document searching unit that searches a document, which includes all of a plurality of phrases selected from the input word list, from the plurality of documents, which include documents having formats different from each other and are stored in a storage device in advance,
wherein the pattern determining unit determines a pattern for each of the documents, which are searched by the document searching unit.

11. The information extraction system according to claim 10, further comprising:
a recreating unit that provides a list of the phrases selected by the phrase selecting unit as the input word list to the document searching unit.

12. The information extraction system according to claim 1, further comprising:
a recreating unit that provides a list of the phrases selected by the phrase selecting unit as the input word list to the pattern determining unit.

13. An information extraction method that extracts phrases in documents from the documents, comprising:
a processing device executing an input step of inputting an input word list including a plurality of phrases;
the processing device executing a storage step of storing, in a storage unit, a plurality of documents including documents having formats different from each other;
the processing device executing a pattern determining step of selecting one document from the plurality of documents stored in the storage unit, finding a pattern, which separates a phrase included in the input word list from other words in the selected document, as a pattern, for each of the documents, and storing in the storage unit the found pattern associated with the selected document;
the processing device executing a phrase candidate extracting step of extracting a character string separated by a pattern stored in the storage unit from a document associated with the pattern and determining the character string as a phrase candidate; and
the processing device executing a phrase selecting step of, among phrase candidates extracted by the phrase candidate extracting step or partial character strings included in the phrase candidates, selecting as a target phrase to be outputted a phrase candidate or a partial character string that satisfies a predetermined condition, wherein in the pattern determining step, the finding the pattern is performed by i) obtaining character strings each consisting of a predetermined number of characters located at least at one of immediately before and after the phrases included in the input word list, and ii) extracting, as the pattern, portions common to at least two of the character strings from the obtained character strings.

14. The information extraction method according to claim 13, wherein the pattern determining step determines a forward character string and a backward character string of the phrase included in the input word list as patterns, the phrase candidate extracting step extracts a character string interposed between the forward character string and the backward character string from the document and determines the extracted character string as a candidate of a phrase, and the phrase selecting step selects a phrase of an output subject from the candidates of the phrases, which are extracted by the phrase candidate extracting step.

15. The information extraction method according to claim 14, wherein the phrase selecting step calculates a phrase score indicating a value of a degree of importance of a candidate of the pattern used in specifying the candidate of the phrase or the amount of documents where the candidate of the phrase appears for each of the candidates of the phrases, and selects the candidate of the phrase having a phrase score is equal to or larger than a predetermined threshold value as the phrase of the output subject.

16. The information extraction method according to claim 14, wherein the phrase selecting step calculates a phrase score indicating a value of a degree of importance of a candidate of the pattern used in specifying the candidate of the phrase or the amount of documents where the candidate of the phrase appears for each of the candidates of the phrases, sorts the candidates of the phrases in the order of high phrase scores, and selects the candidate of the phrase at a predetermined rank or more as the phrase of the output subject.

17. The information extraction method according to claim 14, wherein the phrase selecting step calculates a phrase score indicating a value of a degree of importance of a candidate of the pattern used in specifying the candidate of the phrase or the amount of documents where the candidate of the phrase appears for each of the candidates of the phrases, sorts the candidates of the phrases in the order of high phrase scores, and selects the candidate of the phrase at high ranks of a predetermined ratio as the phrase of the output subject.

18. The information extraction method according to claim 13, wherein the pattern determining step determines only a forward character string of the phrase included in the input word list or a backward character string of the phrase included in the input word list as a pattern, the phrase candidate extracting step extracts a character string subsequent to the forward character string or a character string immediately before the backward character string from the document and determines the extracted character string as the candidate of the phrase, and the phrase selecting step creates partial character strings included in the candidate of the phrase, and selects a phrase of the output subject from the created partial character strings.

19. The information extraction method according to claim 18, wherein the phrase selecting step calculates a ratio of the number of the candidates of the phrases including the partial character strings with respect to a total number of the candidates of the phrases for each of the candidates of the phrases and each of the partial character strings, specifies the partial character strings where the ratio is within a predetermined ratio, calculates a phrase score indicating a value of a degree of importance of the candidate of the pattern used in specifying the candidate of the phrase or the amount of documents where the candidate of the phrase appears for each of the candidates of the phrases including the specified partial character strings to determine the calculation result as the phrase score of the partial character string, and selects the partial character string where a phrase score is equal to or larger than a predetermined threshold value as the phrase of the output subject.

20. The information extraction method according to claim 18, wherein the phrase selecting step calculates a ratio of the number of the candidates of the phrases including the partial character strings with respect to a total number of the candidates of the phrases for each of the candidates of the phrases and each of the partial character strings, specifies the partial character strings where the ratio is within a predetermined ratio, calculates a phrase score indicating a value of a degree of importance of the candidate of the pattern used in specifying the candidate of the phrase or the amount of documents where the candidate of the phrase appears for each of the candidates of the phrases including the specified partial character strings to determine the calculation result as the phrase score of the partial character string, sorts the partial character strings in the order of high phrase scores, and selects the partial character string at a predetermined rank or more as the phrase of the output subject.

21. The information extraction method according to claim 18, wherein the phrase selecting step calculates a ratio of the number of the candidates of the phrases including the partial character strings with respect to a total number of the candidates of the phrases for each of the candidates of the phrases and each of the partial character strings, specifies the partial character strings where the ratio is within a predetermined ratio, calculates a phrase score indicating a value of a degree of importance of the candidate of the pattern used in specifying the candidate of the phrase or the amount of documents where the candidate of the phrase appears for each of the candidates of the phrases including the specified partial character strings to determine the calculation result as the phrase score of the partial character string, sorts the partial character strings in the order of high phrase scores, and selects the partial character string at high ranks of a predetermined ratio as the phrase of the output subject.

22. The information extraction method according to claim 13, further comprising:

a processing device executing a document searching step of searching a document, which includes all of a plurality of phrases selected from the input word list, from the plurality of documents, which include documents having formats different from each other and are stored in a storage device in advance, wherein the pattern determining step determines a pattern for each of the documents, which are searched by the document searching step.

23. The information extraction method according to claim 22, further comprising:

the processing device executing a recreating step of providing a list of the phrases selected by the phrase selecting step as the input word list to the document searching step.

24. The information extraction method according to claim 13, further comprising:

the processing device executing a recreating step of providing a list of the phrases selected by the phrase selecting step as the input word list to the pattern determining step.

25. A non-transitory computer readable medium for storing an information extraction program that is mounted in a computer and allows phrases in documents to be extracted from the documents and the phrases to be output, the information extraction program, when executed by the computer, causing the computer to execute:

an input process that inputs an input word list including a plurality of phrases;

a storage process that stores in a storage unit a plurality of documents including documents having formats different from each other;

a pattern determining process that selects one document from the plurality of documents stored in the storage unit, finds a pattern, which separates a phrase included in the input word list from other words in the selected document, as a pattern, for each of the documents, and stores in the storage unit the found pattern associated with the selected document;

a phrase candidate extracting process that extracts a character string separated by a pattern stored in the storage unit from a document associated with the pattern and determines the character string as a phrase candidate; and a phrase selecting process that, among phrase candidates extracted by the phrase candidate extracting process or partial character strings included in the phrase candidates, selects as a target phrase to be outputted a phrase candidate or a partial character string that satisfies a predetermined condition, wherein in the pattern determining process, finding the pattern is performed by i) obtaining character strings each consisting of a predetermined number of characters located at least at one of immediately before and after the phrases included in the input word list, and ii) extracting, as the pattern, portions common to at least two of the character strings from the obtained character strings.

* * * * *